(12) United States Patent
Wagg

(10) Patent No.: US 8,160,302 B2
(45) Date of Patent: Apr. 17, 2012

(54) IMAGE PROCESSING APPARATUS AND METHOD FOR ESTIMATING ORIENTATION

(75) Inventor: David Wagg, Basingstoke (GB)

(73) Assignee: Sony Corporation, Tokyo (JP)

( * ) Notice: Subject to any disclaimer, the term of this patent is extended or adjusted under 35 U.S.C. 154(b) by 734 days.

(21) Appl. No.: 12/328,474

(22) Filed: Dec. 4, 2008

(65) Prior Publication Data

US 2009/0141941 A1    Jun. 4, 2009

(30) Foreign Application Priority Data

Dec. 4, 2007    (GB) .................................. 0723716.7

(51) Int. Cl.
*G06K 9/00*    (2006.01)

(52) U.S. Cl. ....................... 382/107; 382/291

(58) Field of Classification Search .................. 382/100, 382/103, 107, 286, 291
See application file for complete search history.

(56) References Cited

U.S. PATENT DOCUMENTS

2011/0026761 A1*    2/2011    Radhakrishnan et al. ..... 382/100

FOREIGN PATENT DOCUMENTS

| | | |
|---|---|---|
| EP | 1 343 067 A2 | 9/2003 |
| GB | 2 444 553 A | 6/2008 |
| GB | 2 452 512 A | 3/2009 |
| GB | 2 452 513 A | 3/2009 |
| JP | 2007-233798 | 9/2007 |
| WO | 2007/139544 A1 | 12/2007 |

OTHER PUBLICATIONS

Moeslund, Thomas B. et al., "A Survey of Advances in vision-based human motion capture and analysis," Computer Vision and Image Understanding, vol. 104, pp. 90-126, 2006.
Wagg, D.K., "Local and Global Models for Articulated Motion Analysis," http://eprints.ecs.soton.ac.uk/13222/wagg_phd.thesis.pdf, Jun. 2006.
Winter, David A. et al., "The Biomechanics and Motor Control of Human Gait: Normal, Elderly and Pathological," 1999, pp. 1-10, 121-123.
Whittle, Michael W. et al., "Three-dimensional Relationships between the Movements of the Pelvis and Lumber Spine during normal Gait," Human Movement Science, vol. 18, pp. 681-692, 1991.
Gard, Steve A. et al., "Comparison of Kinematic and Kinetic methods for computing the vertical motion of the body centre of mass during walking," Human Movement Science, vol. 22, pp. 597-610, 2004.

* cited by examiner

*Primary Examiner* — Andrew W Johns
(74) *Attorney, Agent, or Firm* — Oblon, Spivak, McClelland, Maier & Neustadt, L.L.P.

(57) ABSTRACT

Method of estimating orientation of objects disposed on a plane from video images of a scene taken by a video camera. Includes receiving for each object, object tracking data, providing a position of the object on the plane in the image with respect to time, determining from the object tracking data basis vectors associated with an objects, each basis vector corresponding to a factor, which can influence the orientation of the object and each basis vector being related to the movement or location of the one or more objects, and combining the basis vectors in accordance with a blending function to calculate an estimate of the orientation of the object on the plane, the blending function including blending coefficients which determine a relative magnitude of each basis vector used in the blending function.

20 Claims, 20 Drawing Sheets

Legs at full separation

Legs at minimum separation

A) Before shift   B) After shift   C) Before shift   D) After shift
Legs at full separation          Legs at minimum separation

IMAGE PROCESSING APPARATUS AND METHOD FOR ESTIMATING ORIENTATION

CROSS-REFERENCE TO RELATED APPLICATIONS

This application claims priority to UK Patent Application No. GB 0723716.7 filed on Dec. 4, 2007, the entirety being incorporated herein by reference.

FIELD OF THE INVENTION

The present invention relates to apparatus for and methods of estimating an orientation of one or more of a plurality of objects disposed on a plane, from one or more video images of a scene, which includes the objects on the plane produced from a view of the scene by a video camera. The present invention also relates to apparatus and methods of generating a three dimensional representation of a scene which includes the plurality of objects disposed on the plane.

In one example, the objects are human sports players on a sports field, such as football players on a football pitch.

BACKGROUND OF THE INVENTION

There are many situations in which it is desirable to try to extract information from data captured during live action events, such as sporting events, to provide further insight into what is taking place. Such information can be used by broadcasters to enhance a viewing experience provided to viewers watching the live action event. Techniques that provide the extraction of information from captured data include, for example, three dimensional tracking of where a ball landed in relation to the line on a tennis court to determine whether the ball should be called in or out. Another well known example is extrapolating a projected path of a ball which has struck a batsman on his pads in a game of cricket in order to determine if he should be given out leg before wicket.

Another approach is to process video images of a scene to identify objects such as human beings within a scene. In many cases, such as televised sporting events, processing video images in this way can be more convenient, because the video images are already available. However, extracting information from video images is difficult, firstly because the data is captured in only two dimensions by a camera and secondly because the processing of the video images to extract desired information can be computationally intensive and error prone, because objects or players must be recognised from a low or variable resolution representation, due to higher resolution images being provided for images captured near the camera and lower resolution images being captured further from the camera. Furthermore, a high degree of variability in the nature of the movement of humans, makes recognition of players difficult. Other image processing techniques require many cameras to be available in order to capture video images of a subject from several different angles. In Moeslund et al. 2006, "A survey of advances in vision-based human motion capture and analysis", a review of academic literature is presented which examines the available techniques for estimating human motion from captured image data. As discussed in this paper, most techniques require controlled studio capture conditions, high-resolution imagery, multiple cameras (typically at least four) and have very high computational requirements.

SUMMARY OF THE INVENTION

According to a first aspect there is provided method of estimating an orientation of one or more of a plurality of objects disposed on a plane, from one or more video images of a scene, which includes the objects on the plane produced from a view of the scene by a video camera. The method comprises receiving for each of the one or more objects, object tracking data, which provides a position of the object on the plane in the video images with respect to time, determining from the object tracking data a plurality of basis vectors associated with at least one of the objects, each basis vector corresponding to a factor, which can influence the orientation of the object and each basis vector being related to the movement or location of the one or more objects, and combining the basis vectors in accordance with a blending function to calculate an estimate of the orientation of the object on the plane, the blending function including blending coefficients which determine a relative magnitude of each basis vector used in the blending function.

Using the estimate of the orientation of each object, a three dimensional model can be generated which can, as far as possible, represent the scene of the objects on the plane. For example, the scene may be that of a sporting event such as a football match, the objects being football players. The method can generate an estimate of the orientation of each of the players on the plane of the sports pitch. The estimate of the orientation can be combined with the object tracking data for each player to generate a three dimensional representation, which models, as far as possible, the real football match as captured by the video camera.

The present invention allows the orientation of one or more of a plurality of objects to be determined from tracking data indicating the movement and location of the one or more objects. The present invention recognises that although the tracking data provides data indicating the position and movement of the objects, further useful information can be derived from this tracking data, if a number of assumptions are made about the way in which an object will be orientated based on the position and movement of the object itself and other objects. Such assumptions provide the basis vectors, which indicate how the orientation of the object may be influenced in view of the information from the tracking data. The basis vectors are then combined in accordance with a basis function, which is able to give an appropriate weight to each basis vector by virtue of the blending coefficients to provide an orientation value for the object. The blending function effectively produces an estimate of which direction in real life the object will be orientated on the plane using a combination of the various basis vectors. Therefore, an orientation value for the object is provided without the requirement for intensive image processing and in a manner which can be performed in real or pseudo real time.

In accordance with one embodiment of the invention, the basis vectors include an object velocity vector derived from an estimated velocity of the one or more objects determined from the tracking data. In this embodiment, therefore one of the factors that influences the orientation of the object is the object's velocity. This basis factor recognises the fact that the direction an object is facing will depend to some extent on the speed at which the object is moving.

In accordance with another example of the invention, the basis vectors include a centre of attention vector determined by a centre of gravity of the estimated position of the one or more objects derived from the tracking data. This basis factor recognises the fact that the centre of gravity, which is the mean position of all the objects is likely to be a good approximation of the current location of a ball or where the most important event is occurring. The "centre of attention" will also have an influence on the direction that the object is facing.

In accordance with another example, the basis vectors include a centre of attention velocity vector, providing a speed and direction of the motion of the centre of gravity on the plane.

In accordance with another example of the invention, the blending coefficients include an object speed coefficient set in dependence upon the estimated speed of the one or more objects. In accordance with this example, it is recognised that the degree to which each basis vector will influence the overall orientation value depends, amongst other things, on the speed of the object. An object running at full speed or near full speed is likely to be orientated toward the direction of travel, rather than any other direction.

In accordance with another example, the blending coefficients include a centre of attention distance coefficient set in dependence upon an estimated distance of the one or more objects from the centre of attention derived from the tracking data. In accordance with this example, it is ensured that the orientation value of the object does not tend to an unstable value if the object is at or near the centre of attention.

Various further aspects and features of the present invention are defined in the appended claims, which include an apparatus for and a method of generating a three dimension representation of a scene, which includes a plurality of objects disposed on a plane. The aspects also include and a data carrier having a recordable medium on which there is recorded information signals representing a computer program for performing the method according to any of the appended claims.

BRIEF DESCRIPTION OF THE DRAWINGS

Embodiments of the present invention will now be described by way of example with reference to the accompanying drawings, in which.

DESCRIPTION OF EXAMPLE EMBODIMENTS

Figure 1:
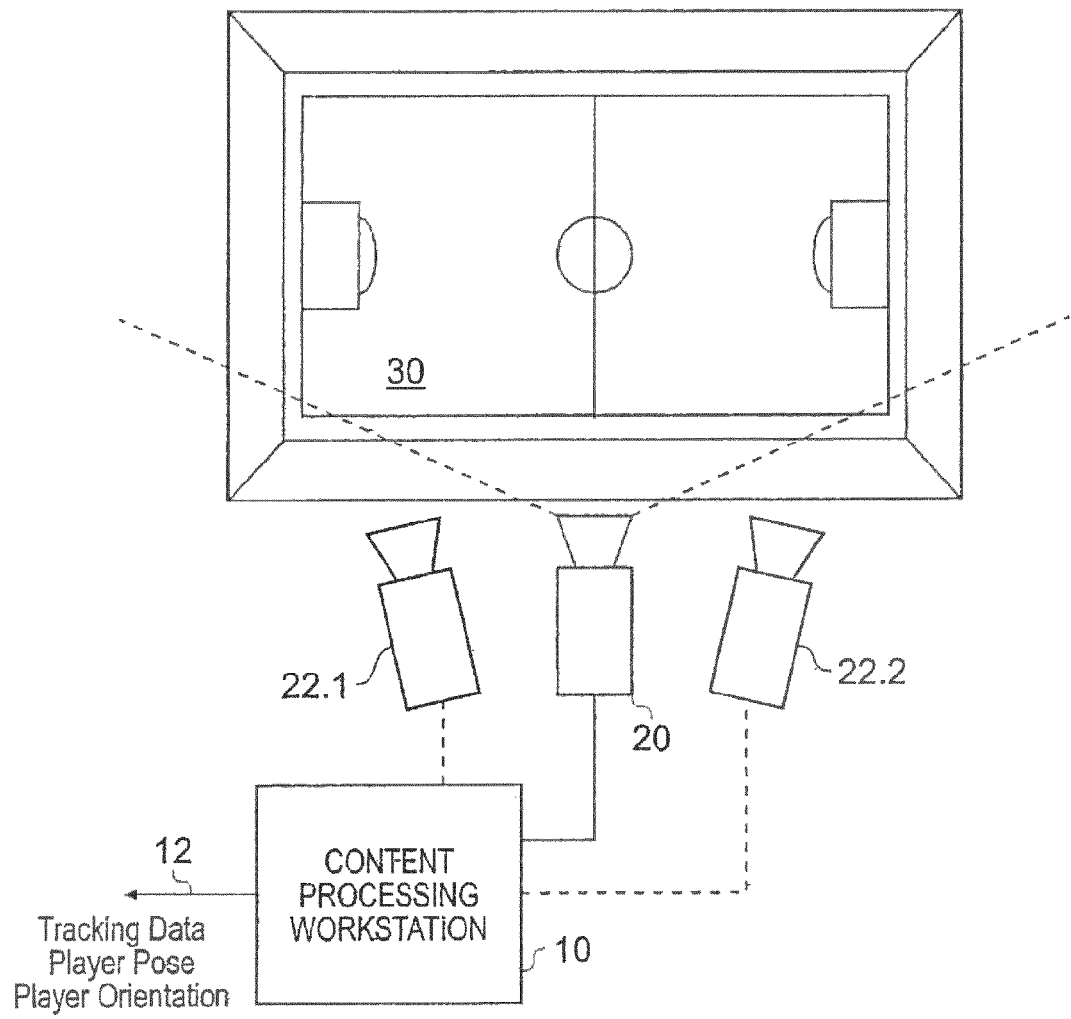
FIG. 1 is a schematic diagram of an object tracking system in accordance with an embodiment of the present invention.

FIG. 1 shows a schematic diagram of an object tracking system in accordance with embodiments of the present invention. In the embodiment shown in FIG. 1, the objects to be tracked are football players (not shown) on a football pitch 30.

High definition (HD) video images (1920 by 1080 pixels) of the pitch 30 are captured by one or more high definition cameras. Although, embodiments of the present invention can be used to track objects in video images from more than one camera, in some examples only a single camera is used. As will be appreciated, HD cameras are expensive, so that using only a single camera can reduce an amount of expense required to implement systems which utilise the present technique. However, using only a single camera provides only a single two dimensional view of a scene within which the objects are disposed. As a result tracking of the objects within the scene represented by the video images can be more difficult, because occlusion events, in which one object obscures another are more likely. Such a single camera 20 example is shown in FIG. 1, although as illustrated by camera 22.1, 22.2 optionally two cameras can be used, each pointing at a different half of the football pitch.

In FIG. 1, a video camera 20 is disposed at a fixed point within the football stadium and arranged to communicate signals representing video images captured by the camera 20 to a content processing workstation 10, which carries out image processing and other operations so as to track the position of the players on the pitch with respect to time. Data representing the position of the players with respect to time is then logged so that metadata and match statistics can be generated such as the length of time a particular player spent in a particular part of the pitch, how far each player ran and the like. The data representing the position of the players with respect to time forms path data for each player, which relates to the path that each player has taken within the video images. The path data is generated with respect to a three dimensional model of the football pitch (object plane) in order to provide information associated with movement of the players with respect to their position on the pitch, which are not readily apparent from the (two dimensional) video images. This generated path data can then be used to enhance a viewing experience for a viewer when footage of the football match is transmitted via a suitable medium to the viewer or to assist a coach when coaching the football team. The tracking of objects such as players on the pitch 30 will be described in more detail below.

As shown in FIG. 1, the content processing workstation 10 generates at an output 12 tracking data, player pose data and player orientation data. The tracking data is representative of the position of each of the players on each team on the football field with respect to time. Thus, from the tracking data a relative motion of each player in terms of a velocity (providing speed and direction on the football field) can be generated. From this information the player pose data can be estimated. The player pose data results from a process which estimates a pose of each player, as the players appear on the real football pitch viewed from the camera which produced the video images. The video images are used to match the pose of the player as the player moves around the football pitch. The generation of the pose estimation will be explained in more detail shortly. Similarly, the player orientation is generated to estimate the relative orientation of the player on the football pitch. Thus, the orientation corresponds to a relative angular position which the player is facing at any one time on the football field. The player orientation data is extracted from the tracking data. The generation of the tracking data, the player pose data and the player orientation data is performed within the content processing workstation 10 by different processors or different software modules as represented in FIG. 2.

Figure 2:
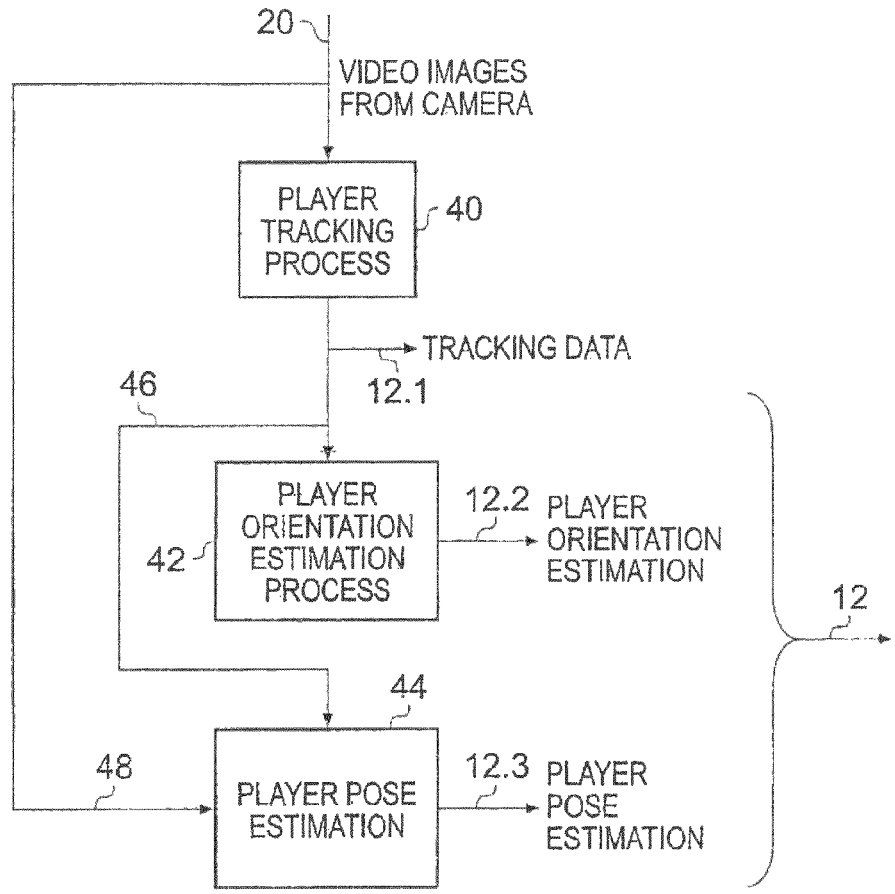
FIG. 2 is a schematic block diagram of the content processing workstation shown in FIG. 1.

In FIG. 2 a player tracking process module 40 receives a signal representative of the video images captured from the camera 20 or indeed the other video cameras 22.1, 22.2. The player tracking process generates the player tracking data, which is output by an output channel 12.1. The tracking data is also received by a player orientation estimation process module 42, which uses the tracking data to generate a relative orientation of the player, in terms of the direction which the player is facing, from the tracking data for any position on the football field identified by that tracking data. The player orientation estimation process will be described in more detail shortly.

A player pose estimation module 44 receives both the video images from the camera 20 and on a further channel 46 the tracking data produced by the player tracking module 40. As will be explained shortly, the player pose estimation module generates a player pose estimation for each player representing the relative posture of the player with respect to time for each position on the field identified by the tracking data. The player orientation data and the player pose estimation data are output on channels 12.2, 12.3 to form collectively the data output on the channel 12 as shown in FIG. 1. It will be appreciated that the system and method of object tracking, orientation and pose according to embodiments of the present invention need not be limited to tracking players on a football pitch. For example, players of other team sports such as rugby, cricket, American football, ice hockey, basketball and the like could be tracked.

According to the present technique, the video images, which are generated using the HD video camera 20 are arranged to capture a view of the whole pitch, so that the players on the pitch can be tracked. Thus the whole pitch is captured from a static position of the camera 20, although as mentioned above, more than one camera could be used, in order to capture the whole pitch. In one example, as mentioned above, the two cameras 22.1, 22.2 may be used each of which is directed at different halves of the pitch. In this example, the video images generated by each camera may be stitched together by the content processing workstation 10 as described in United Kingdom Patent Application No. 0624410.7 so as to form ultra high resolution video images. In this embodiment, after undergoing the stitching process, the output from the camera cluster can be thought of as a single ultra-high resolution image.

The advantages of the ultra-high definition arrangement are numerous including the ability to highlight particular features of a player without having to optically zoom and therefore affecting the overall image of the stadium. Furthermore, the automatic tracking of an object is facilitated because the background of the event is static and there is a higher screen resolution of the object to be tracked.

Figure 3:
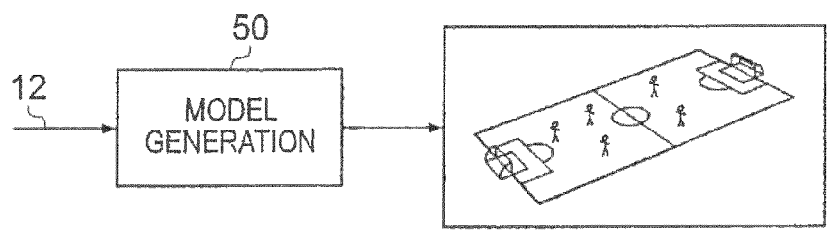
FIG. 3 is a schematic illustration of a three dimensional model generation processor, utilising the information generated by the content processing work station shown in FIGS. 1 and 2.

As shown in FIG. 3, the data received from channel 12 is in one embodiment fed to a model generation processor 50. The model generation processor receives the tracking data, the player orientation estimation data and the player pose data and generates a three-dimensional model which represents the football pitch with each of the players represented by synthesised models providing a like representation of each player. Thus, the three-dimensional representation is as far as possible a reflection of the football match as observed through the video camera represented by the video images received from the camera 20.

Object Tracking

Object tracking in accordance with embodiments of the present invention will now be described with reference to FIGS. 4, 5 and 6.

Figure 4:
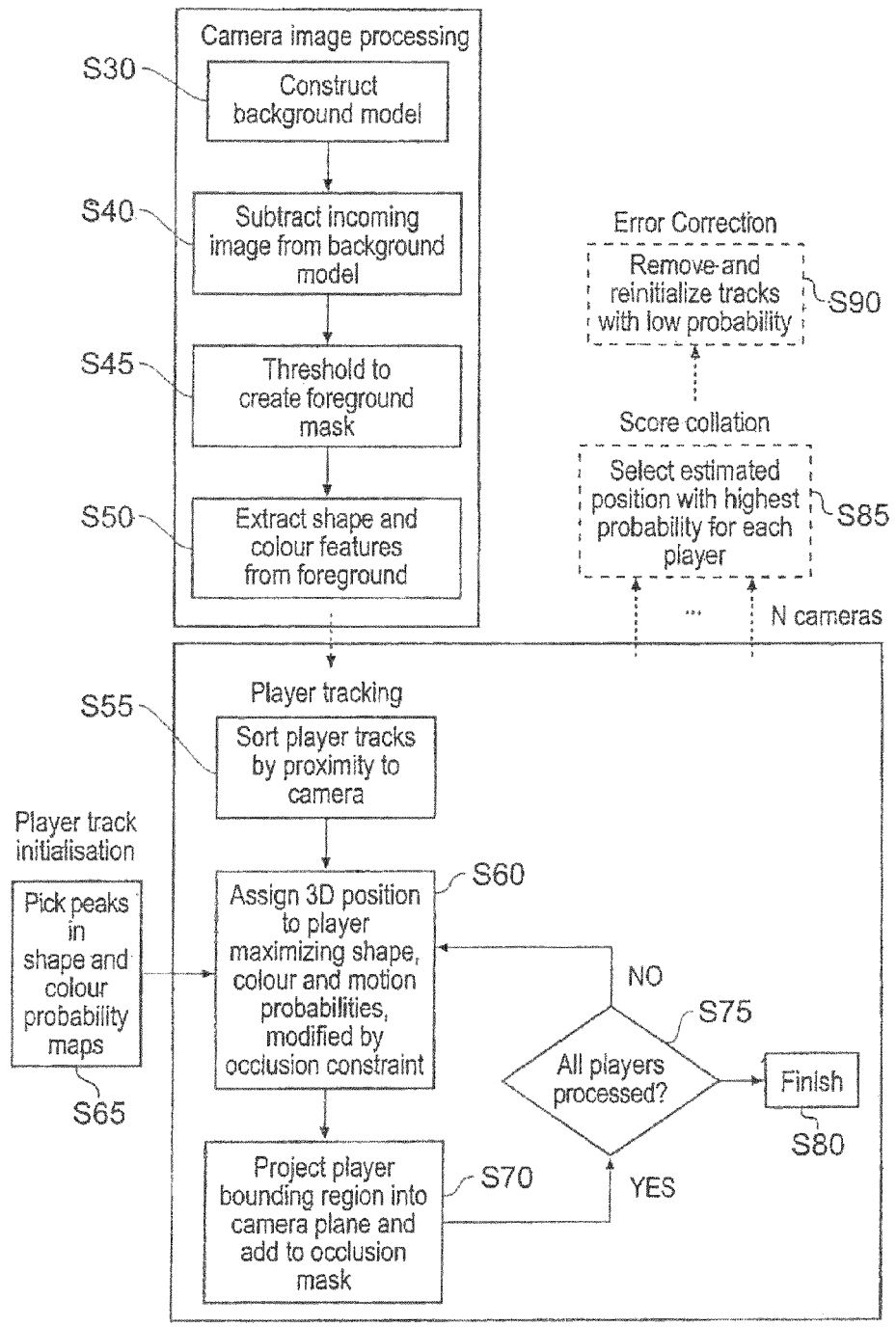
FIG. 4 is a flow diagram of a method of object tracking in accordance with embodiments of the present invention.

FIG. 4 shows a flowchart of a method of object tracking in accordance with embodiments of the present invention. In order to track an object, a background model is constructed from those parts of the received video that are detected as being substantially static over a predetermined number of frames. In a first step S30 the video image received from the camera 20, which represents the football pitch is processed to construct the background model of the image. The background model is constructed in order to create a foreground mask which assists in identifying and tracking the individual players. The background model is formed at step S30 by determining for each pixel a mean of the pixels and a variance of the pixel values between successive frames in order to build the background model. Thus, in successive frames where the mean value of the pixels do not change greatly then these pixels can be identified as background pixels in order to identify the foreground mask.

Such a background/foreground segmentation is a process which is known in the field of image processing and the present technique utilises an algorithm described in document by Manzanera and Richefeu, and entitled "A robust and Computationally Efficient Motion Detection Algorithm Based on $\Sigma$-$\Delta$ Background Estimation", published in proceedings ICVGIP, 2004. However, the present technique should not be taken as being limited to this known technique and other techniques for generating a foreground mask with respect to a background model for use in tracking are also known.

It will be appreciated that, in the case where the field of view of the video camera encompasses some of the crowd, the crowd is unlikely to be included in the background model as they will probably be moving around. This is undesirable because it is likely to increase a processing load on the Cell processor when carrying out the object tracking as well as being unnecessary as most sports broadcasters are unlikely to be interested in tracking people in the crowd.

In an embodiment of the present invention, the background model is constructed at the start of the game and can even be done before players come onto the pitch. Additionally, the background model can be recalculated periodically throughout the game so as to take account of any changes in lighting condition such as shadows that may vary throughout the game.

In step S40, the background model is subtracted from the incoming image from the camera to identify areas of difference. Thus the background model is subtracted from the image and the resultant image is used to generate a mask for each player. In step S45, a threshold is created with respect to the pixel values in a version of the image which results when the background model has been subtracted. The background model is generated by first determining the mean of the pixels over a series of frames of the video images. From the mean values of each of the pixels, the variance of each of the pixels can be calculated from the frames of the video images. The variance of the pixels is then used to determine a threshold value, which will vary for each pixel across all pixels of the video images. For pixels, which correspond to parts of the image, where the variance is high, such as parts which include the crowd, the threshold can be set to a high value, whereas the parts of the image, which correspond to the pitch will have a lower threshold, since the colour and content of the pitch will be consistently the same, apart from the presence of the players. Thus, the threshold will determine whether or not a foreground element is present and therefore a foreground mask can correspondingly be identified. In step S50 a shape probability based on a correlation with a mean human shape model is used to extract a shape within the foreground mask. Furthermore, colour features are extracted from the image in order to create a colour probability mask, in order to identify the player, for example from the colour of the player's shirt. Thus the colour of each team's shirts can be used to differentiate the players from each other. To this end, the content processing workstation 10 generates colour templates in dependence upon the known colours of each football team's team kit. Thus, the colour of the shirts of each team is required, the colour of the goal keeper's shirts and that of the referee. However, it will be appreciated that other suitable colour templates and/or template matching processes could be used.

Returning to FIG. 4, in step S50 the content processing workstation 10 compares each of the pixels of each colour template with the pixels corresponding to the shirt region of the image of the player. The content processing workstation then generates a probability value that indicates a similarity between pixels of the colour template and the selected pixels, to form a colour probability based on distance in hue saturation value (HSV) colour space from team and pitch colour models. In addition, a shape probability is used to localise the players, which is based on correlation with a mean human shape model. Furthermore, a motion probability is based on distance from position predicted by a recursive least-squares estimator using starting position, velocity and acceleration parameters.

The creation of player masks is illustrated in FIG. 3A. FIG. 3A shows a camera view 210 of the football pitch 30 generated by the video camera 20. As already explained, the pitch 30 forms part of the background model, whilst the players 230, 232, 234, 236, 238, 240 should form part of the foreground mask as described above. Player bounding boxes are shown as the dotted lines around each player.

Thus far the steps S30, S40, S45 and S50 are performed with a respect to the camera image processing. Having devised the foreground mask, player tracking is performed after first sorting the player tracks by proximity to the camera in step S55. Thus, the players which are identified as being closest to the camera are processed first in order to eliminate these players from the tracking process. At step S60, player positions are updated so as to maximise shape, colour and motion probabilities. In step S70 an occlusion mask is constructed that excludes image regions already known to be covered by other closer player tracks. This ensures that players partially or wholly occluded by other players can only be matched to visible image regions. The occlusion mask improves tracking reliability as it reduces the incidence of track merging (whereby two tracks follow the same player after an occlusion event). This is a particular problem when many of the targets look the same, because they cannot be (easily) distinguished by colour. The occlusion mask allows pixels to be assigned to a near player and excluded from the further player, preventing both tracks from matching to the same set of pixels and thus maintaining their separate identities.

There then follows a process of tracking each player by extracting the features provided within the camera image and mapping these onto a 3D model as shown in FIGS. 3A and 3B. Thus, for corresponding a position within the 2D image produced by the camera, a 3D position is assigned to a player which maximises shape, colour and motion probabilities. As will be explained shortly, the selection and mapping of the player from the 2D image onto the 3D model will be modified should an occlusion event have been detected. To assist the mapping from the 2D image to the 3D model in step S65 the players to be tracked are initialised to the effect that peaks in shape and colour probability are mapped onto the most appropriate selection of players. It should be emphasised that the initialisation, which is performed at step S65 is only performed once, typically at the start of the tracking process. For a good initialisation of the system, the players should be well separated. After initialisation any errors in the tracking of the players are corrected automatically in accordance with the present technique, which does not require manual intervention.

In order to effect tracking in the 3D model from the 2D image positions, a transformation is effected by use of a projection matrix P. Tracking requires that 2D image positions can be related to positions within the 3D model. This transformation is accomplished by use of a projection (P) matrix. A point in 2D space equates to a line in 3D space:

$$\begin{bmatrix} x \\ y \\ 1 \end{bmatrix} = \begin{bmatrix} P_{00} & P_{01} & P_{02} & P_{03} \\ P_{10} & P_{11} & P_{12} & P_{13} \\ P_{20} & P_{21} & P_{22} & P_{23} \\ 0 & 0 & 0 & 1 \end{bmatrix} \begin{bmatrix} x' \\ y' \\ z' \\ w \end{bmatrix}$$

Figure 5A:
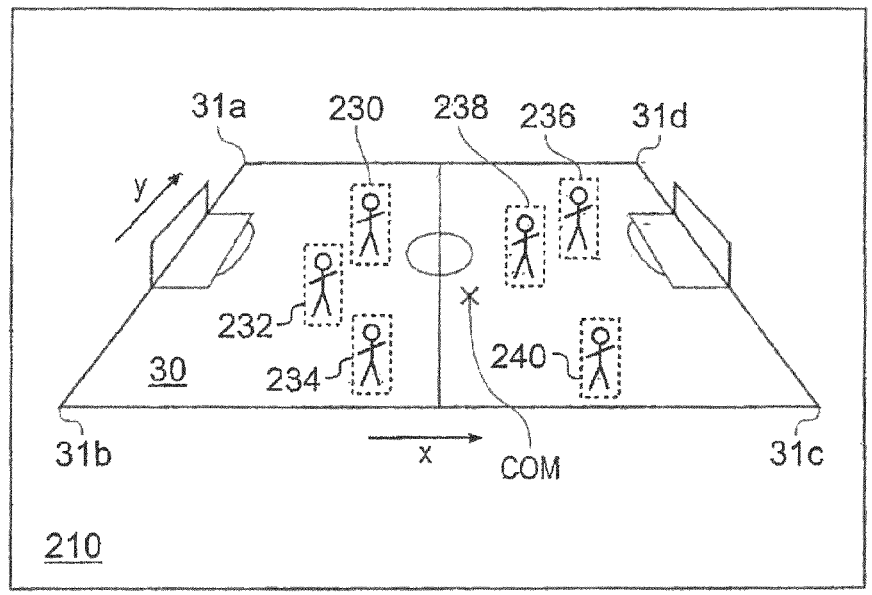
FIGS. 5A and 5B are schematic diagrams of object tracking in accordance with an embodiment of the present invention.

A point in a 2D space equates to a line in a 3D space because a third dimension, which is distance from the camera, is not known and therefore would appear correspondingly as a line across the 3D model. A height of the objects (players) can be used to determined the distance from the camera. A point in 3D space is gained by selecting a point along the line that lies at a fixed height above the known ground level (the mean human height). The projection matrix P is obtained a priori, once per camera before the match by a camera calibration process in which physical characteristics of the pitch such as the corners 31A, 31B, 31C, 31D of the pitch 30, shown in FIG. 5A are used to determine the camera parameters, which can therefore assist in mapping the 2D position of the players which have been identified onto the 3D model. This is a known technique, using established methods. In terms of physical parameters, the projection matrix P incorporates the camera's zoom level, focal centre, 3D position and 3D rotation vector (where it is pointing).

The tracking algorithm performed in step S60 is scalable and can operate on one or more cameras, requiring only that all points on the pitch are visible from at least one camera (at a sufficient resolution).

Figure 5B:
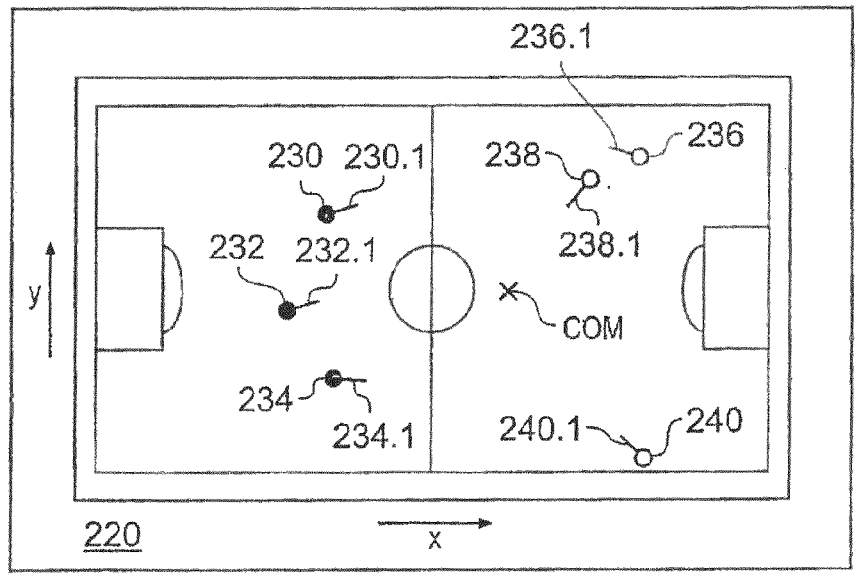

In addition to the colour and shape matching, step S60 includes a process in which the motion of the player being tracked is also included in order to correctly identified each of the players with a greater probability. Thus, the relevant movement of players between frames can be determined both in terms of a relevant movement and in a direction. Thus, the relative motion can be used for subsequent frames to produce a search region to identify a particular player. Furthermore, as illustrated in FIG. 5B, the three dimensional model of the football pitch can be augmented with lines to 230.1, to 232.1, to 234.1, to 236.1, to 238.1, 240.1 which are positioned relative to the graphic indication of the position of the players to reflect the relative direction of motion of the players on the football pitch. Further explanation of a technique for determining the orientation, providing a relative direction of motion of the player will be provided shortly.

At step S70, once the relative position of the players has been identified in the three dimensional model, then this position is correspondingly projected back into the 2D image view of the football pitch and a relative bound is projected around the player identified from its position in the 3D model. Also at step S70, the relative bound around the player is then added to the occlusion mask for that player.

FIG. 5B shows a plan view of a virtual model 220 of the football pitch. In the embodiment shown in FIG. 5B, the players 230, 232, and 234 (on the left hand side of the pitch) have been identified by the content processing workstation 10 as wearing a different coloured football shirt from the players 236, 238, and 240 (on the right hand side of the pitch) thus indicating that they are on different teams. Differentiating the players in this way makes the detection of each player after an occlusion event easier as they can easily be distinguished from each other by the colour of their clothes.

Referring back to FIG. 4, at a step s60, the position of each player is tracked using known techniques such as Kalman filtering although it will be appreciated that other suitable techniques may be used. This tracking takes place both in the camera view 210 and the virtual model 220. In an embodiment of the present invention, velocity prediction carried out by the content processing workstation 10 using the position of the players in the virtual model 220 is used to assist the tracking of each player in the camera view 210.

Steps S60 and S70 are repeated until all players have been processed as represented by the decision box S75. Thus, if not all players have been processed then processing proceeds to step S60 whereas if processing has finished then the processing terminates at S80.

As shown in FIG. 4, the method illustrated includes a further step S85, which may be required if images are produced by more than one camera. As such, the process steps S30 to S80 may be performed for the video images from each camera. As such, each of the players will be provided with a detection probability from each camera. Therefore, according to step S85, each of the player's positions is estimated in accordance with the probability for each player from each camera, and the position of the player estimated from the highest of the probabilities provided by each camera, so that the position with the highest probability for each player is identified as the location for that player.

If it has been determined that an error has occurred in the tracking of the players on the football pitch then the track for that player can be re-initialised in step S90. The detection of an error in tracking is produced where a probability of detection of a particular player is relatively low for a particular track and accordingly, the track is re-initialised.

A result of performing the method illustrated in FIG. 4 is to generate path data for each player, which provides a position of the player in each frame of the video image, which represents a path that that player takes throughout the match. Thus the path data provides position with respect to time.

Our co-pending UK patent application number 0717277.8 discloses a solution to the separate technical problems of tracking players in the event of an occlusion in which one player passes in front of another. Thus, when tracking the position of each player from a single camera view if one player obscures a whole or part of another player, UK patent application 0717277.8 provides a disclosure of an arrangement for maintaining tracking information for both players until the ambiguity is resolved. One way in which the ambiguity can be resolved is to identify the players using an automatic number recognition processing, such as that disclosed in our co-pending UK patent application number 0717279.4.

Player Orientation

As mentioned above, embodiments of the present technique provide a process for estimating an object's orientation on a plane, such as a player's orientation on a field of play, from a two dimensional image of that player on the field of play generated by a camera. The orientation of the player on the field of play can be used to orientate a synthesised representation of that player on a three dimensional model of the playing field. Thus embodiments of the present technique can be used generally to generate a three dimensional representation of a scene, which includes a plurality of objects disposed on a plane, the three dimensional representation being generated from the video images of the scene. The video images include the objects on the plane produced from a view of the scene by a video camera. Thus for the example of players playing on a football pitch, the players can be modelled and represented in a three dimensional model, which reflects as far as possible a real football match captured on video images, by processing those video images to generate tracking data, as explained above, and from that tracking data to generate for each player an orientation of that player on the football pitch, as explained below.

Determining the orientation of a player by means of image processing, would be computationally intensive, because it is necessary to compare a model of the player, against the image region once for each possible orientation. Furthermore this process is error-prone, because the footage available is often low resolution, and there is a high pose variability of football players.

For these reasons orientation is determined heuristically, that is to say, using high-level features provided by the tracking data for the players, described above for each frame. These features are the player's current velocity $v_p$, the current centre of attention C and the velocity of the centre of attention $v_c$. Additionally, the vector displacement $d_c$ from the player to the attention centre is computed. Thus the tracking data for each individual player is combined with the tracking data collectively for all players on the pitch to generate a player orientation.

The centre of attention is the point at which the players are assumed to be focused on (the focus of play); for football this would normally be the position of the ball. However, because it is difficult to find the ball, particularly with monocular imagery, using a single camera, an approximation to the location of the ball is employed. According to this approximation, it is assumed that players will generally cluster around the ball, and therefore the "centre of mass" COM of the all the players (excluding goalkeepers) is a good approximation to the attention centre. The centre of mass COM is marked with an X on FIGS. 5A and 5B. The centre of gravity is an analogous expression to the centre of gravity of an object, which corresponds to the mean location on the plane of the pitch of all of the players. In practice this works well, generally failing only when there are abrupt turnovers (for example due to a goal kick or long pass), or game-stopping events (free kicks etc.)

Each player is assigned an orientation computed from three basis orientation vectors:

$$O_{pm} = \frac{v_p}{\|v_p\|}, \quad O_{cm} = \frac{v_c}{\|v_c\|}, \quad O_c = \frac{d_c}{\|d_c\|}$$

Where $O_{pm}$ is the orientation aligned to the player's direction of motion, $O_{cm}$ is the orientation aligned to the attention centre's direction of motion and $O_{cm}$ is the orientation directed towards the attention centre. Thus the basis function $O_{cm}$ corresponds to the relative velocity and direction of motion of the attention centre.

Two blending factors are used to combine the three basis vectors in a smoothly-varying fashion, such that players are orientated towards the focus of play, unless they are either very close to the centre of play or are moving quickly.

Motion Blending Factor:

$$B_m = \begin{cases} \|v_p\| \geq T_{SH}, & 1 \\ T_{SL} < \|v_p\| < T_{SH}, & \frac{\|v_p\| - T_{SL}}{T_{SH} - T_{SL}} \\ \|v_p\| \leq T_{SL}, & 0 \end{cases}$$

Where $T_{SL}$=low speed threshold and $T_{SH}$=high speed threshold.

Centre Blending Factor:

$$B_c = \begin{cases} \|d_c\| \geq T_{DH}, & 1 \\ T_{DL} < \|d_c\| < T_{DH}, & \frac{\|d_c\| - T_{DL}}{T_{DH} - T_{DL}} \\ \|d_c\| \leq T_{DL}, & 0 \end{cases}$$

Where $T_{DL}$=low distance threshold and $T_{DH}$=high distance threshold.

Using these blending factors the final player orientation O is computed as:

$$O = B_m * O_{pm} + (1 - B_m) * (B_c * O_c + (1 - B_c) * O_{cm})$$

Note that the above blending equations implement a linear blend. Other blending methods are available (for example sigmoid function), but it is not clear that any significant improvement in results could be gained by using these methods.

As for the example illustration shown in FIG. 5B, the player orientation vector O computed above, can be used to adjust the representation of the relative orientation of each of the players on the computer generated model, as represented by the direction lines 230.1, 232.1, 234.1, 236.1, 238.1, 240.1.

Figure 6:
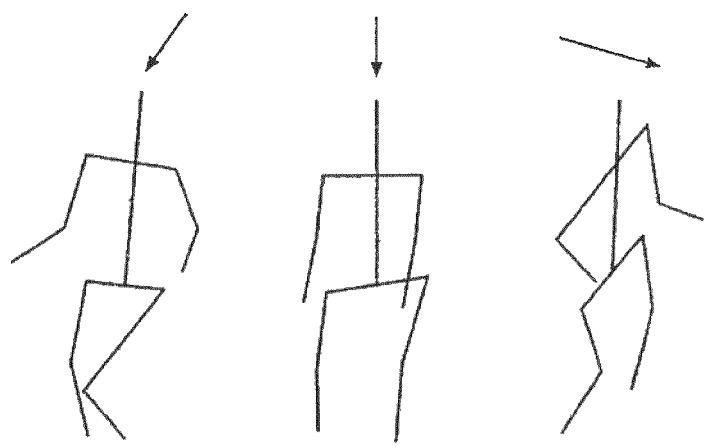
FIG. 6 is a schematic illustration of a stick model of a synthesised figure.

FIG. 6 provides three example representations of an orientation of a simplified synthetic model a human player for each of three sample directions. Thus, for each player on the pitch the player orientation estimation module 42 generates a relative orientation of that player on the football pitch using the algorithm of blending the basis factors as described above. The representations in FIG. 6 are of so-called stick models, which represent the position of each of the limbs of the players. The relative orientations however, can be applied to more realistic synthesised representations of each of the characters to produce the three-dimensional model shown in FIG. 7 which is another example of the representation shown in FIG. 5A. It will be appreciated that in one embodiment, the player orientation estimation module 42, can be used without the player pose module 44. However, in combination the player orientation and player pose estimation provided by the two modules 42, 44 serve to provide sufficient information from which a realistic synthesised model of the football match can be generated.

Player Pose

As mentioned above, embodiments of the present invention provide a technique for estimating a pose of a human or animal body from video images taken of that body. As illustrated in FIG. 2, in one example the pose of a football player can be estimated by the player pose estimation module 44, although in other examples, the player pose may be estimated without an estimation of the player orientation. As will be explained below, embodiments of the present technique, provide a facility for automatically detecting the pose of a player and for matching this pose to a synthesised model of that player. As such, a three dimensional model representing the football match can be generated to model, as far as possible what is actually present in the video images of the real scene.

As explained above, the computationally complexity of using image processing alone to match the pose of a player to that of a synthesised model of a player is prohibitive, since the computational complexity for estimating the player pose is even greater then that for estimating the player orientation. This is because it is necessary to compare the player model (or part of player model) against image region containing the player once for each possible pose of which there are many. In addition this process is prone to error, particularly because the resolution of the images of the player is low. Furthermore, the position and orientation of the player, must be determined with a high level of accuracy as a prerequisite, whereas self-occlusion of players moving behind other players other and deformation of clothing introduce additional difficulties.

There are many known approaches to pose estimation by image processing in the academic literature. However, most require controlled studio capture conditions, high-resolution imagery, multiple cameras (four or more) and have unfeasibly high computational requirements. For example, Moeslund et al. 2006, "A survey of advances in vision-based human motion capture and analysis" provides an overview of known techniques. For tracking twenty three players simultaneously in real-time, in uncontrolled lighting conditions and using low-resolution imagery at the player level, the state-of-the-art methods are inadequate. Even with HD video, players at the far end of the pitch may occupy a region as small as 15×30 pixels making player pose estimation particularly difficult.

As a result of the computational complexity of image processing techniques, embodiments of the present technique employ a minimum of image processing, deriving the majority of pose information from mean gait models. Gait, whether walking, running or sprinting, is a periodic pattern of motion that has been measured in a number of anatomical studies. These studies define, for normal human gait, joint rotations measured at regular intervals over the gait cycle.

Examples of gait models are disclosed in Winter 1991, "The Biomechanics and Motor Control of Human Gait: Normal, Elderly and Pathological", Whittle et al. 1999, "Three-dimensional Relationships between the Movements of the Pelvis and Lumbar Spine during Normal Gait", and Gard et al. 2004, "Comparison of kinematic and kinetic methods for computing the vertical motion of the body centre of mass during walking".

In one example, three mean gait models, $G_W$, $G_R$, $G_S$, for walking, running and sprinting gaits are constructed. Each of these models define a rotation of the leg and arm joints, pelvis and torso rotations, and excursion of the body centre of mass along the vertical, horizontal and frontal axes. Thus each gait model $G_W$, $G_R$, $G_S$, has a set of functions which define for any point in the gait cycle a motion degree for each of the hip, knee, ankle etc. An average gait period (length in time of a single gait cycle, which is right heel strike to right heel strike) is assigned to each model, with a corresponding player speed at which the model becomes active. We define blending factors for the sprint model $B_S$, running $B_R$ and walking $B_W$ as follows:

$$B_S = \begin{cases} \|v_P\| \geq S_S, & \frac{\|v_P\|}{S_S} \\ S_R < \|v_P\| < S_S, & \frac{\|v_P\| - S_R}{S_S - S_R} \\ \|v_P\| \leq S_R, & 0 \end{cases}$$

$$B_R = \begin{cases} \|v_P\| \geq S_S, & 0 \\ S_R < \|v_P\| < S_S, & \frac{S_S - \|v_P\|}{S_S - S_R} \\ S_W < \|v_P\| < S_R, & \sqrt{\frac{\|v_P\| - S_W}{S_R - S_W}} \\ \|v_P\| \leq S_W, & 0 \end{cases}$$

$$B_W = \begin{cases} \|v_P\| \geq S_R, & 0 \\ S_W < \|v_P\| < S_R, & \left(1 - \sqrt{\frac{\|v_P\| - S_W}{S_R - S_W}}\right) \\ \|v_P\| \leq S_W, & \sqrt{\frac{\|v_P\|}{S_W}} \end{cases}$$

The basis model $G_B$ for a given player moving with velocity $v_p$ is computed by blending between the two closest (in speed) gait models, using the above blending factors:

$$G_B = B_W G_W + B_R G_R + B_S G_S$$

Note that the blending factors implement a linear transition between running and sprinting modes of gait, but the first two transitions differ. The gait models are aiming to model stride rather than cadence. When moving from standing to walking, a square root is applied such that the transition is more rapid at the beginning. This has an advantage of preventing or at least reducing the appearance of skating or sliding of the synthesised models of the players on the pitch, represented by the blended gait model, when the player is moving at a very low speed, so that the legs are seen to be moving soon after the player starts moving. Similarly, walking and running are distinctly different modes of gait, and so a linear transition is inappropriate. In this case, the transition between the two is again made more abrupt by the use of the square root.

This basis gait model matches the player's motion to a general population average for their speed. A particular pose is selected by varying the model phase, which defines the point in the gait cycle that the player currently occupies. The player model is animated by the following phase update equation:

$$\theta_{t+1} = \theta_t \pm w$$

Where θ is the gait model phase, w is the frequency in radians per frame and t is the current frame number. The sign of the phase correction is decided by the direction of gait, which is positive if the player is moving forwards and negative if the player is moving backwards. Gait direction is decided according to the angle α between the player motion vector $O_{pm}$ and the player orientation (facing) vector O:

$$\alpha = \cos^{-1}(O \cdot O_{pm}), \text{sign} = \begin{cases} \alpha \leq 0.5\pi, & + \\ \alpha > 0.5\pi, & - \end{cases}$$

Figure 8:
FIG. 8 is a schematic illustration of a pixelated image of a football player with a fore ground box, according to an example embodiment of the present invention, with the legs of the player at full separation, and FIG. 9 provides a corresponding schematic illustration for the legs at a minimum separation.
Figure 9:

In order to match the generated player poses to the observed images, some image processing is required to determine a suitable phase offset (initial pose) for each frame. Given a suitable method of player tracking, such as that disclosed in co-pending UK patent application number 0717277.8, the position and size of the player is known. Also available is a foreground mask. The foreground mask defines, which image pixels are likely to belong to a player. From the foreground mask the current phase of the player's gait is estimated, as at phase=0 and phase=π the player's legs will be fully separated (heel-strike) as shown in FIG. 8, which correspond to left heel strike and right heel strike, and at phase=0.5π and ³⁄₂π the legs will be together (crossing), as shown in FIG. 9. Thus 100% of the gait cycle will correspond to 2π radians.

Figure 10:
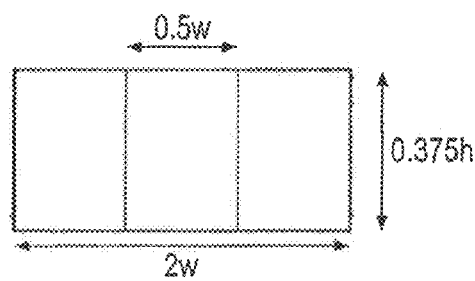
FIG. 10 provides an example illustration of a mask for isolating an inner and outer region around a players legs.

In order to distinguish these between these gait phases a mask is constructed to overlay the inner and outer regions of the player's legs. This is the mask shown in FIG. 10. An example of an isolating mask having inner and outer regions to isolate the player's legs is shown in FIG. 10, where (w, h)=(width, height) of the player bounding box.

Figure 11:
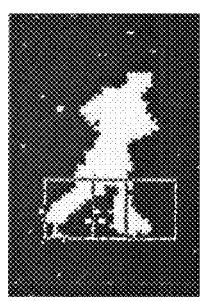
FIG. 11(a) is a schematic illustration of a pixelated image of a football player with the bounding box of FIG. 10 superimposed on the legs of the player at full separation, before an adjustment of the position of the bounding box.
FIG. 11(b) shows a corresponding schematic illustration with the bounding box after the adjustment in the position.
FIG. 11(c) is a corresponding illustration of a pixelated image of the football player with the bounding box of FIG. 10 superimposed on the legs of the player at minimum separation, before an adjustment of the position of the bounding box
FIG. 11(d) shows a corresponding illustration after an adjustment of the position of the bounding box.
Figure 11:
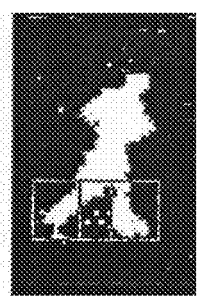
Figure 11:
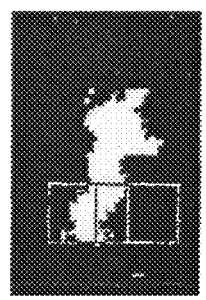
Figure 11:

The player tracking algorithm locates the centre of the player, which is not necessarily aligned to the centre of the lower leg region, particularly for running and sprinting gaits. To remedy any misalignment, the leftmost and rightmost foreground pixels within the outer mask are located, and a new centre is computed as the average of these two points. The mask is then shifted to this new centre, as illustrated in FIGS. 11(*a*) showing the position of the bounding box before being adjusted, and 11(*b*) showing the position of the bounding box after being shifted, for the players legs at full separation, and at FIGS. 11(*c*) and 11(*d*) for before and after the shift of the bounding box for the players legs at minimum separation.

The next step is to count the sum total of pixels in the inner ($S_I$) and outer ($S_O$) portions of the mask, and compute the ratio of outer to inner pixels ($R_{OI}$), normalised to a value between −1 and 1:

$$R_{OI} = \frac{(S_O - S_I)}{\max(S_O, S_I)}$$

Figure 12:
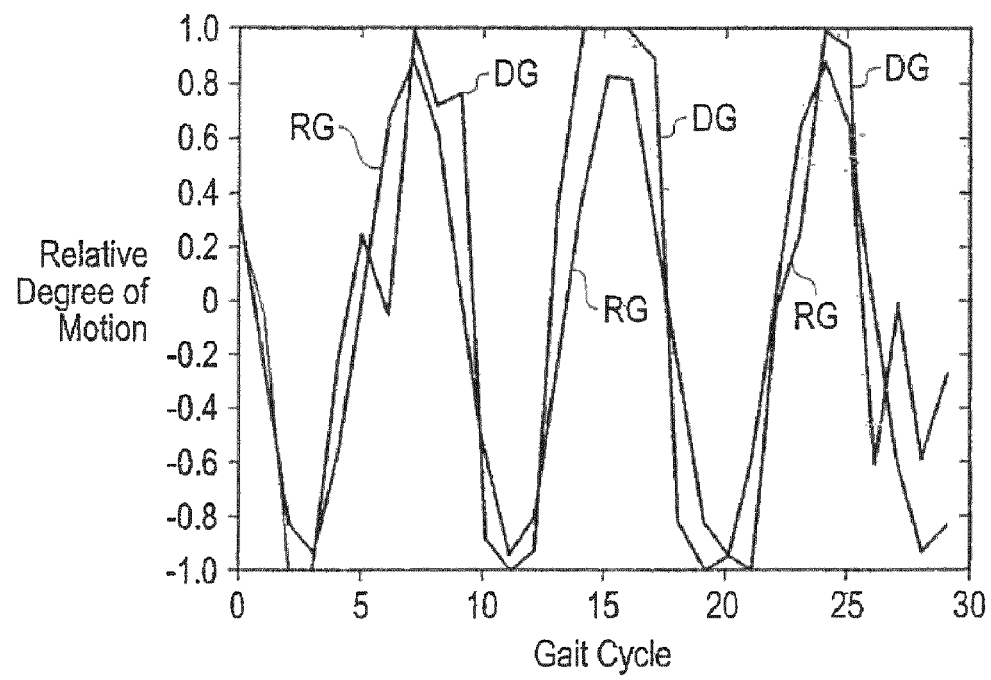
FIG. 12 is a graphical representation of a relative degree of motion with respect to gait cycle for a detected gait and a representative gait.
Figure 16:
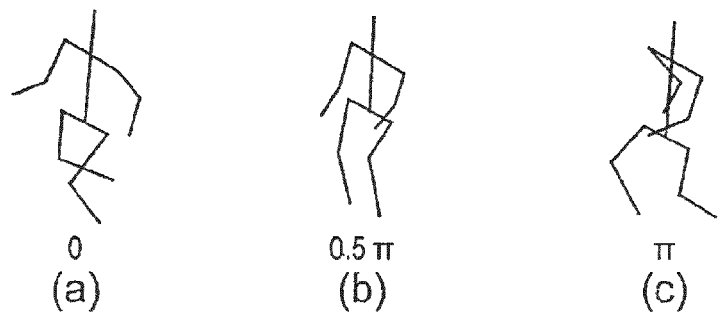
FIG. 16 is a schematic representation of a synthesised model of a football player for three example poses with respect to the graphical plot shown in FIG. 15.
Figure 15:
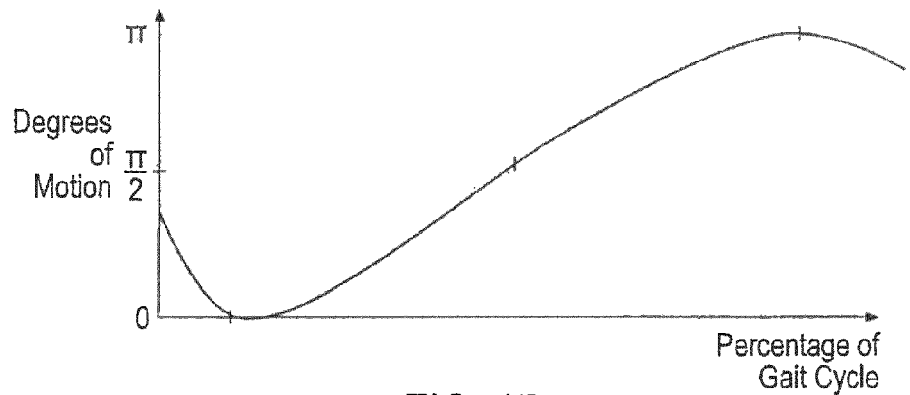
FIG. 15 provides an illustrative plot of relative degrees of motion against percentage of gait cycle for a synthesised model of the player of FIG. 14.

Plotting this ratio over time yields a time-varying sequence as shown in FIG. 12, by the line marked DG representing the detected gait.

As can be seen from the line DG shown in FIG. 12, a very noisy measurement is produced due to shadows, occlusion by other players and the crude approximation of leg sectors made by the mask.

A least-squares sinusoidal fit can be determined to provide the best sinusoidal function matching the measured mask ratios, which is represented by the line marked with RG as the representative gait approximation. This process yields an optimal phase and amplitude for a given frequency of sinusoid. However, this is not ideal, because an approximate phase estimate has already been computed by adding the gait frequency to the phase found in the previous frame, and the amplitude of these ratio measurements is irrelevant. There is also no continuity constraint in the fitting process, so it cannot guaranteed that the phase estimate for a given frame will be close to the phase computed for the previous frame. Consequently, the current phase is estimated by use of gradient descent in a small neighbourhood about the predicted phase $\theta_{t+1}$. This also results in lower computational requirements. If the information available is very poor for whatever reason, the phase estimate is maintained uncorrected, so that the legs will still appear to move normally (although their pose in individual frames may not match the observed data).

It should be noted that the present technique cannot distinguish between left leg forward and right leg forward (a phase shift of π in the model); further processing is required to make this distinction. Also, from frontal viewpoints little or no pose information can be inferred, as the motion of the legs is not readily apparent. However, in this case there is no problem, as the phase update equation ensures that the player's legs continue to move, and any error in phase alignment will not be readily apparent to the viewer.

Figure 14:
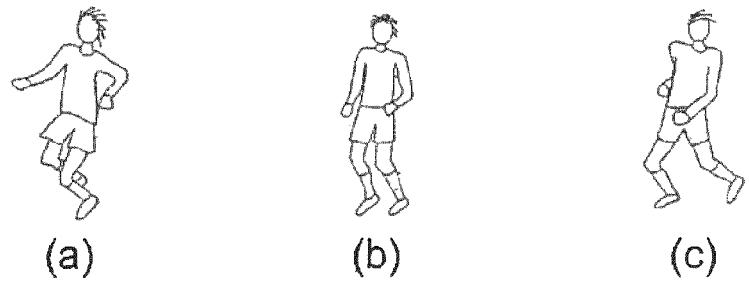
FIG. 14 is a schematic representation of a football player for three example poses with respect to the graphical plot shown in FIG. 13.
Figure 13:
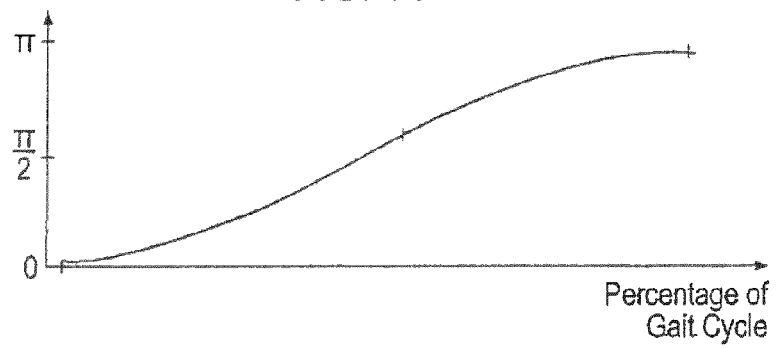
FIG. 13 provides an illustrative plot of relative degrees of motion against percentage of gait cycle for an example video image of a player.

A further example illustrative representation of the relative gait phase, which can be detected for a player from the video images of that player is represented in FIGS. 13 and 14. As shown in FIG. 13, a plot of a relative motion phase with a respect to phase of gait cycle is shown with respect to a representation of an actual player as the player would be shown from the video images, is shown in FIGS. 14(*a*), (*b*) and (*c*). Thus, FIG. 14(*b*) corresponds to the player with his/her legs together corresponding to a motion degree of phase π/2 and 3π/2, whereas Figures (a) and (c) correspond to the maximum motion displacement of the limbs in opposite directions according to zero and π radians respectively. Correspondingly, a gait cycle with respect to degrees of motion graph is provided in FIG. 15 for an example synthesised character shown in FIG. 16(*a*), (*b*) and (*c*), which illustrates a relative gait phase for a synthesised character. Thus, as it will be appreciated FIGS. 13, 14, 15 and 16 illustrate an operation of the player pose estimation module 44, which is arranged to:

Detect a gait phase of a particular player on the pitch as represented from the video images;

From the video images a calculation of gait phase with respect to gait cycle for a given frequency of the player's gait;

Generate a gait model and a corresponding gait cycle with respect to motion degrees for a synthesised player; and Match the gait phase cycle of the synthesised model to that of the actual player in order to match the pose of the synthesised model to that of the actual player present in the video images.

Figure 17:
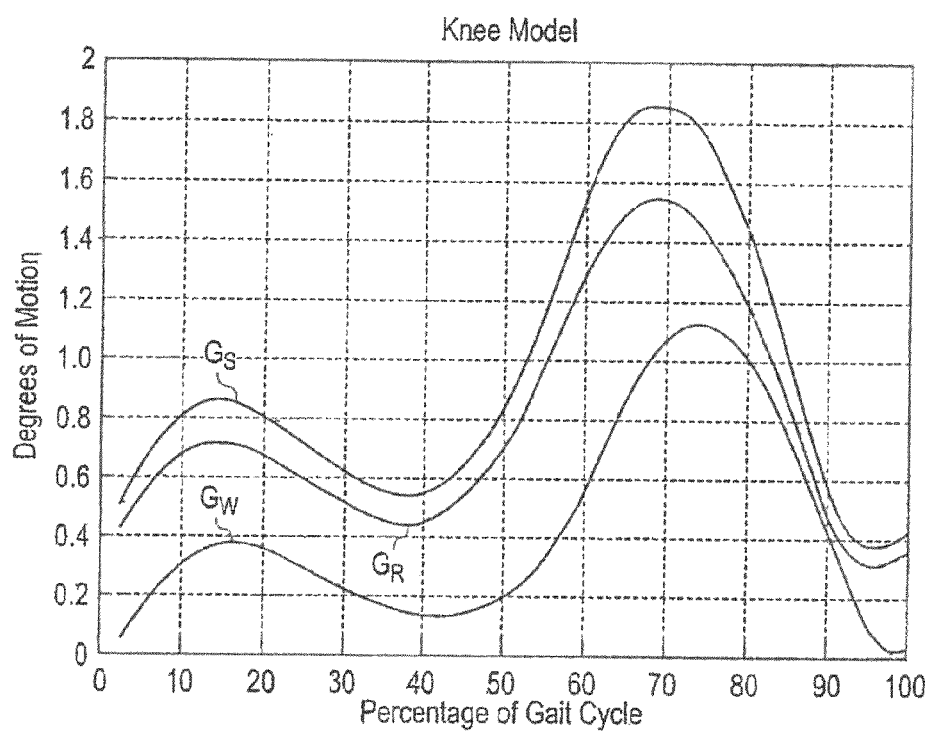
FIG. 17 is a graphical plot of degrees of motion against percentage of gait cycle for knee rotation of a typical human gait for three gait models of walking, running and sprinting.
Figure 18:
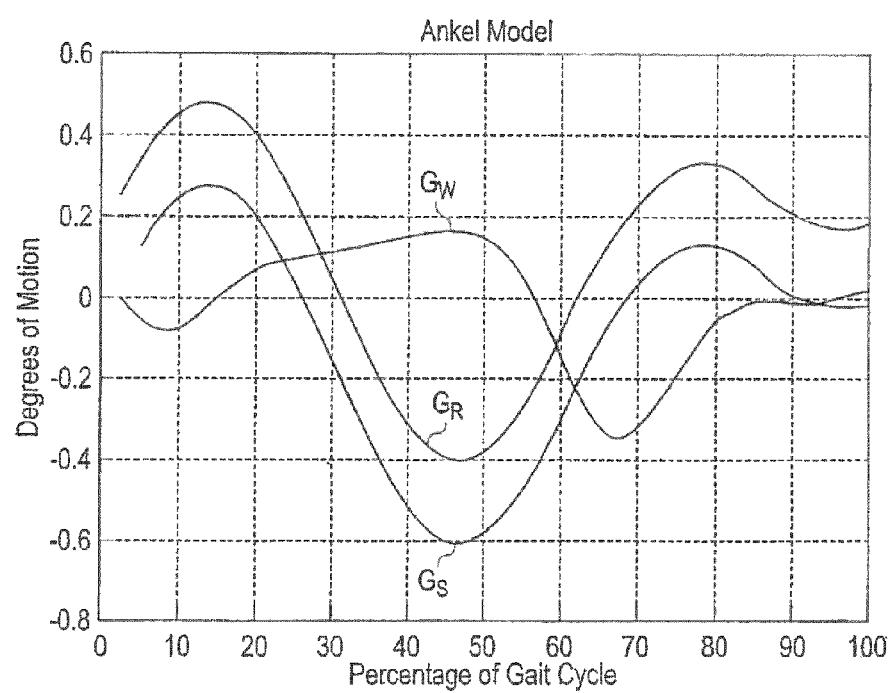
FIG. 18 is a graphical plot of degrees of motion against percentage of gait cycle for ankle rotation of a typical human gait for three gait models of walking, running and sprinting.
Figure 19:
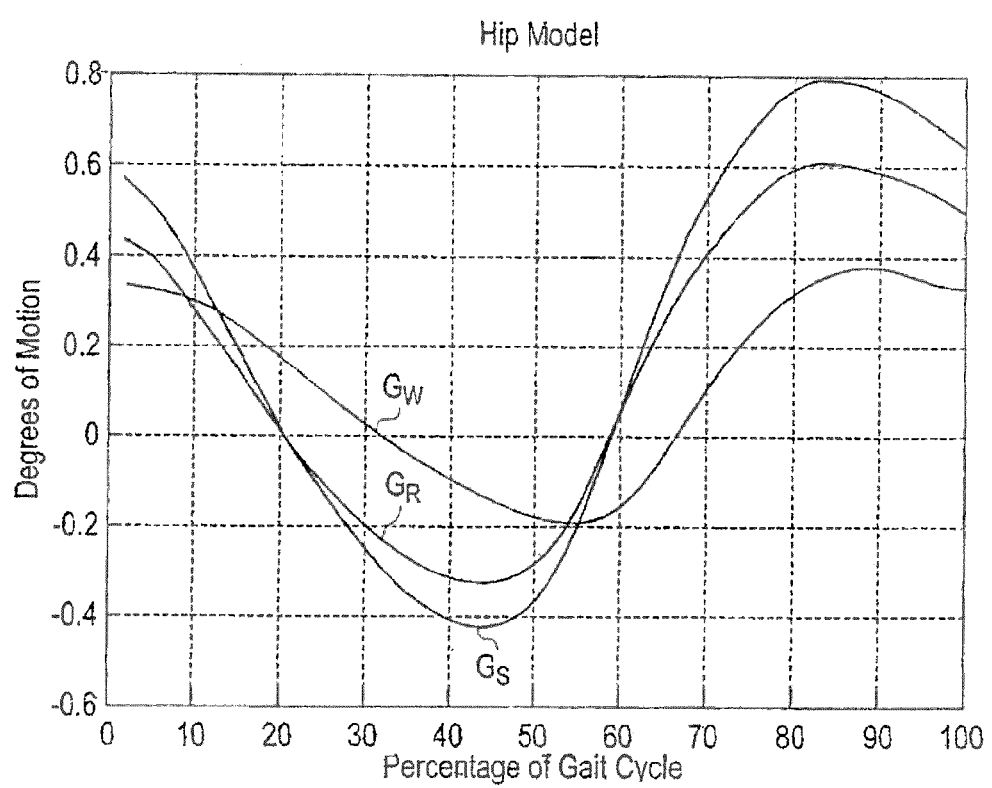
FIG. 19 is a graphical plot of degrees of motion against percentage of gait cycle for hip rotation of a typical human gait for three gait models of walking, running and sprinting.

The player gait phase of the detected image and the gait phase of the synthesised model are generated with respect to the motion of the lower limbs. As explained above, this is produced from a combination of motion degrees with respect to percentage gait cycle for each of the gait models which are walking, running and sprinting. Examples of knee, ankle and hip rotation phase from which the gait models $G_W$, $G_R$, $G_S$, are formed are shown in FIGS. 17, 18 and 19. Thus, each of these rotation/cycle functions is used to form the gait models for the relative position of the lower limbs, which can be used to produce the gait cycle shown in FIG. 12.

Figure 20:
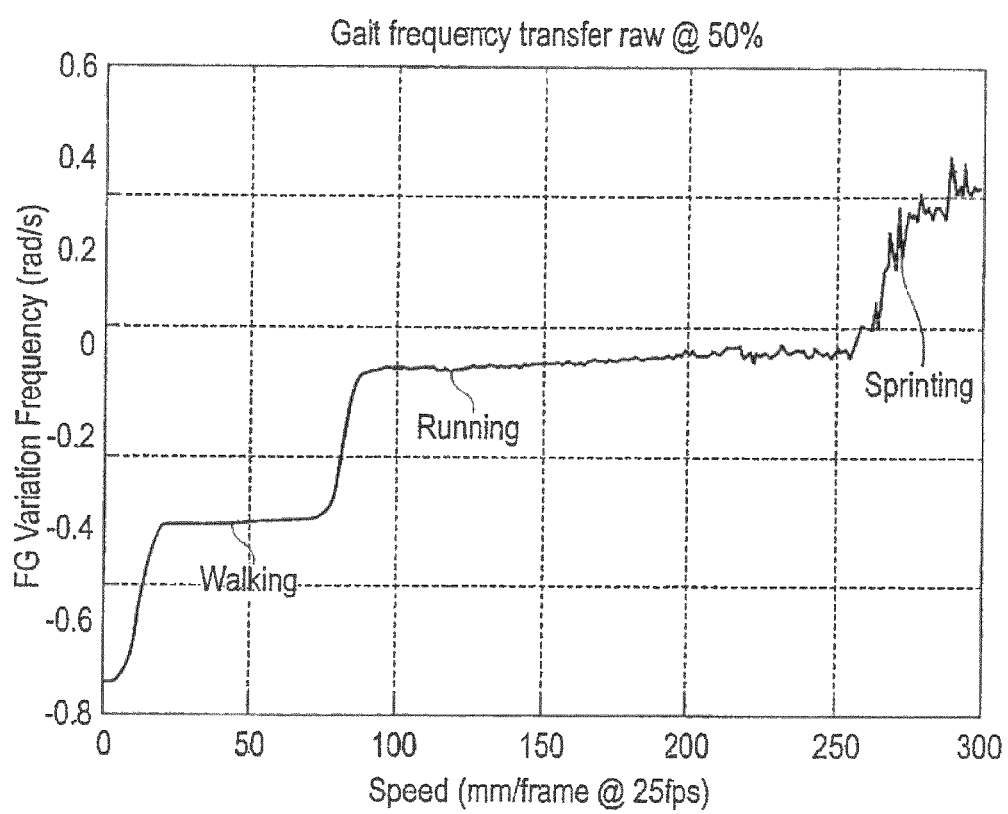
FIG. 20 is a graphical plot of foreground variation frequency against speed of movement, measured for all players (except the goal keeper) in an example football match.
Figure 21:
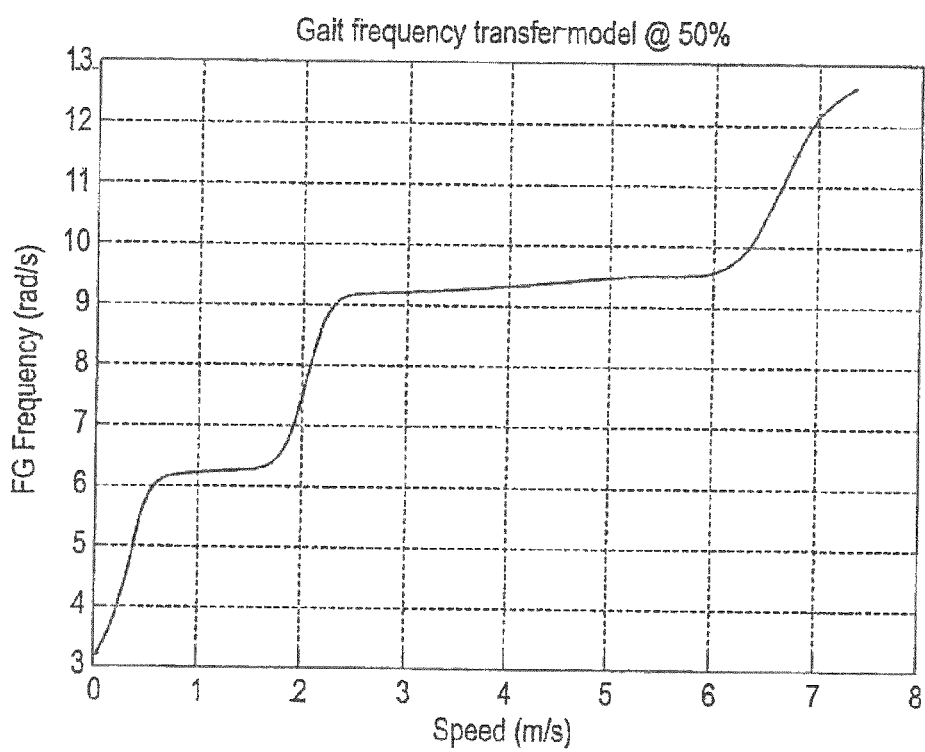
FIG. 21 is a graphical plot of gait frequency against speed of movement for the player corresponding to the example shown in FIG. 20, which provides a gait transfer function between speed and gait frequency.

FIGS. 20 and 21 illustrate a gait frequency transfer function showing a relationship between the player speed and gait frequency. FIG. 20 provides an illustration of raw measurements produced from doing a least squares sinusoid fit to the frequency gait mask measurements whereas FIG. 21 produces a filtered representation of the gait model frequency transfer function which defines the expected frequency for a given speed. With reference to the explanation provided above, it will be appreciated that the gait model frequency is half that of the sinusoid filter fitted the mask measurements, which are shown in FIG. 12. This is a consequence of being unable to distinguish between left and right leg forward from the mask measurements, which give an estimate of the angle between the legs rather than an estimate of the angle of each leg with respect to the vertical axis.

As shown in FIGS. 20 and 21, each of three plateaus corresponding to walking, running and sprinting are shown for the variation in gait frequency for a given speed. As a result of the blending function, there is a smooth transition between each of the respective gait models, walking, running and sprinting.

Example Illustration

Figure 22:
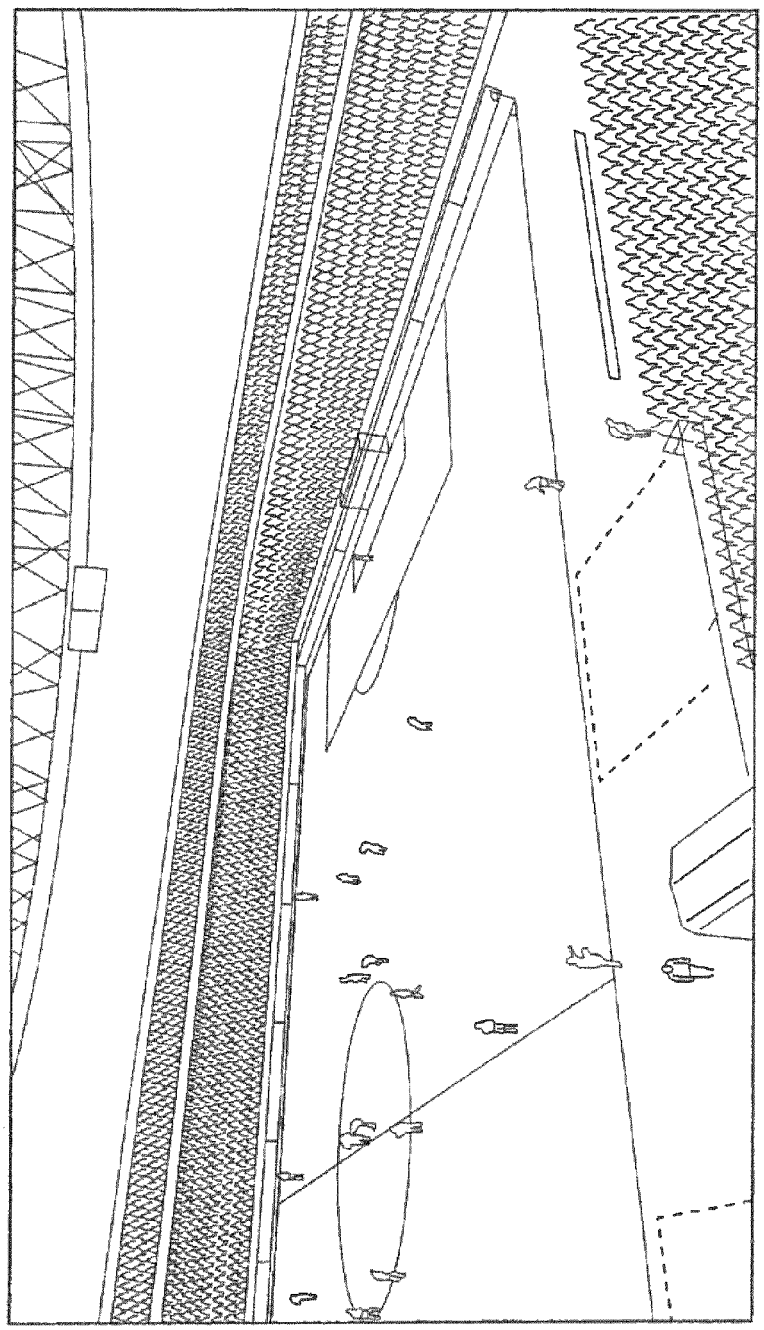
FIG. 22 is an illustration of a video image captured from a scene, which shows a football match with players to be tracked.
Figure 23A:
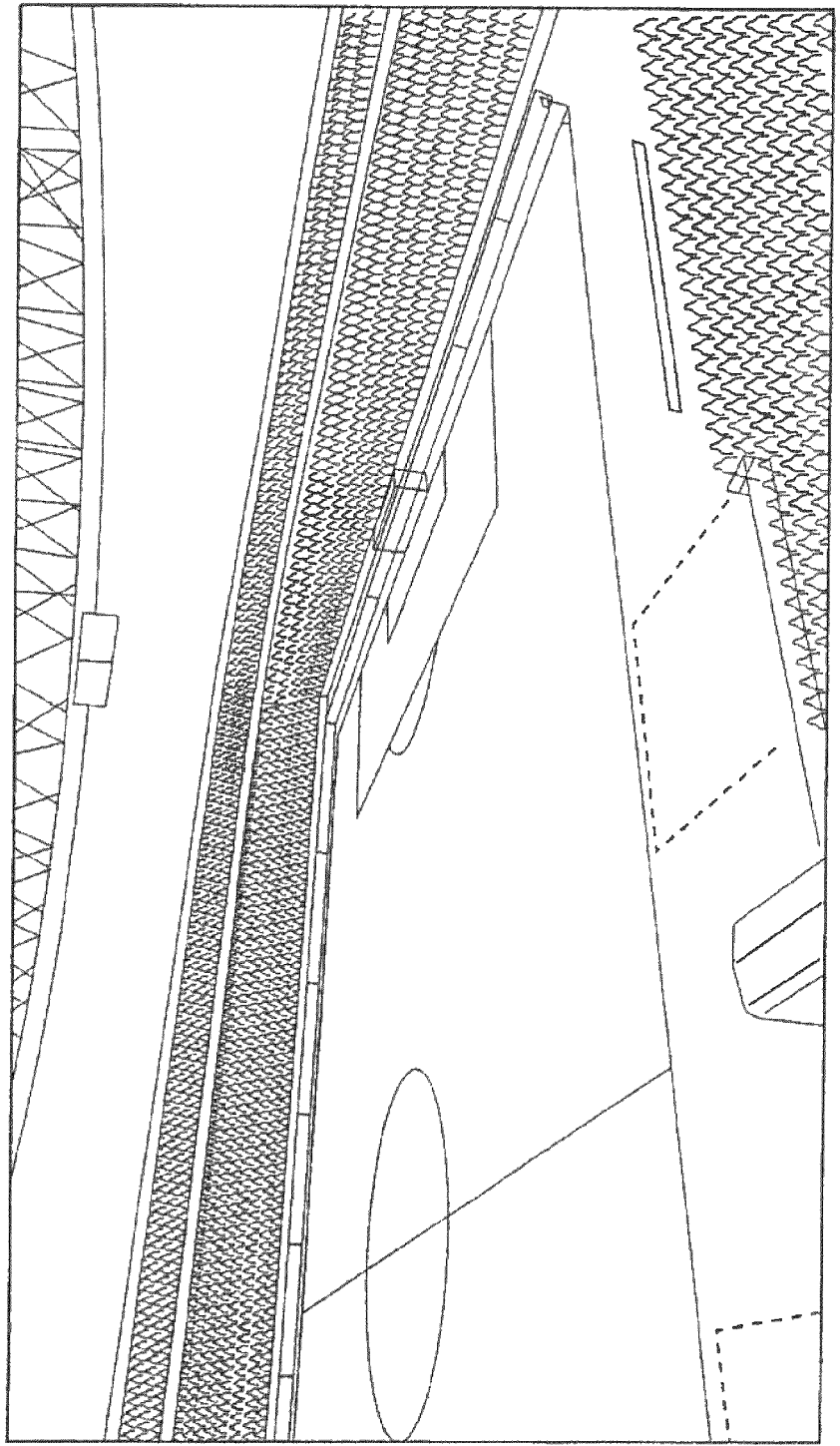
FIG. 23A is an illustration of a video image which has been processed in accordance with the present technique to produce a background model, by taking the mean
Figure 23B:
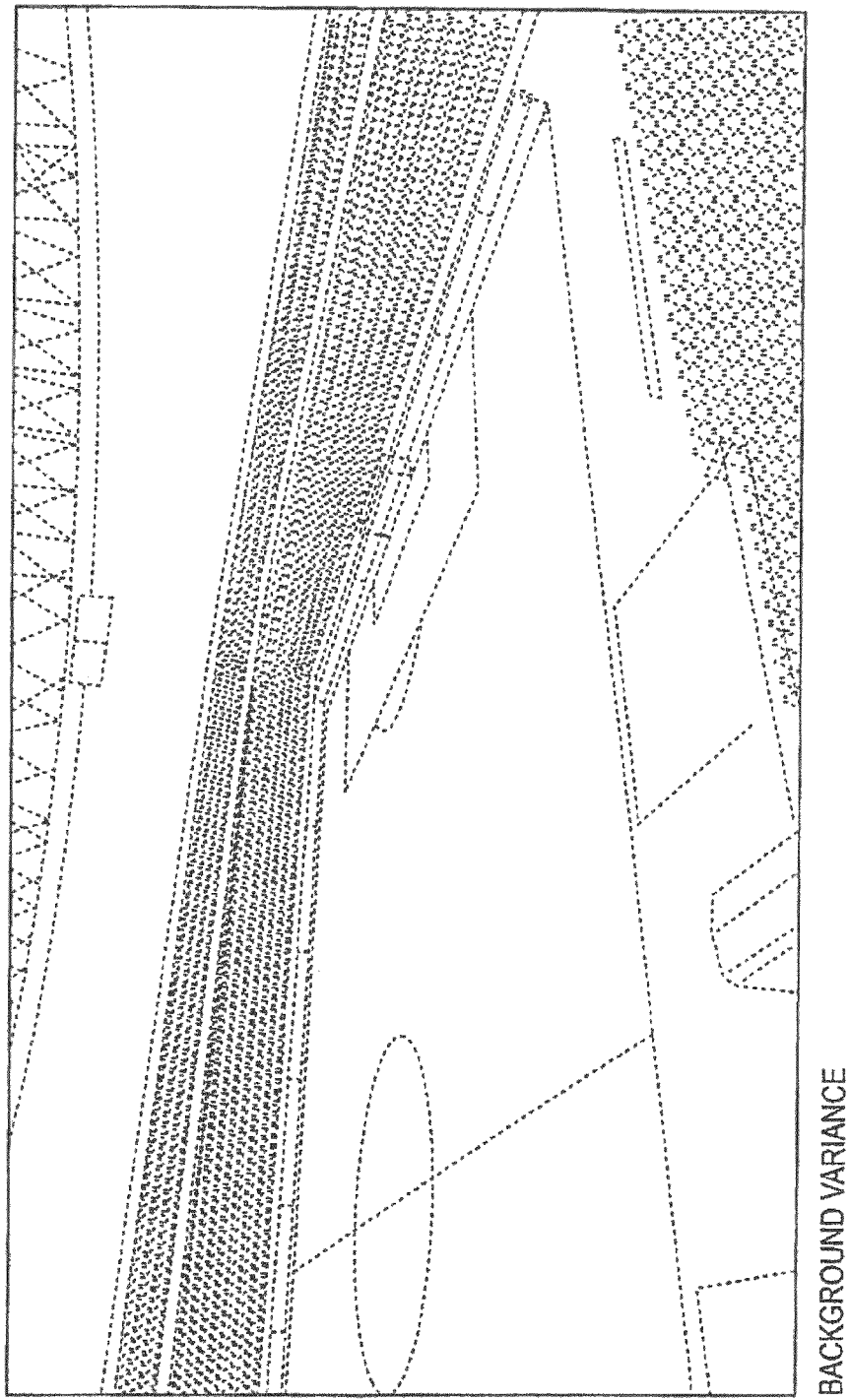
FIG. 23B shows the background model when considering the variance.
Figure 24:
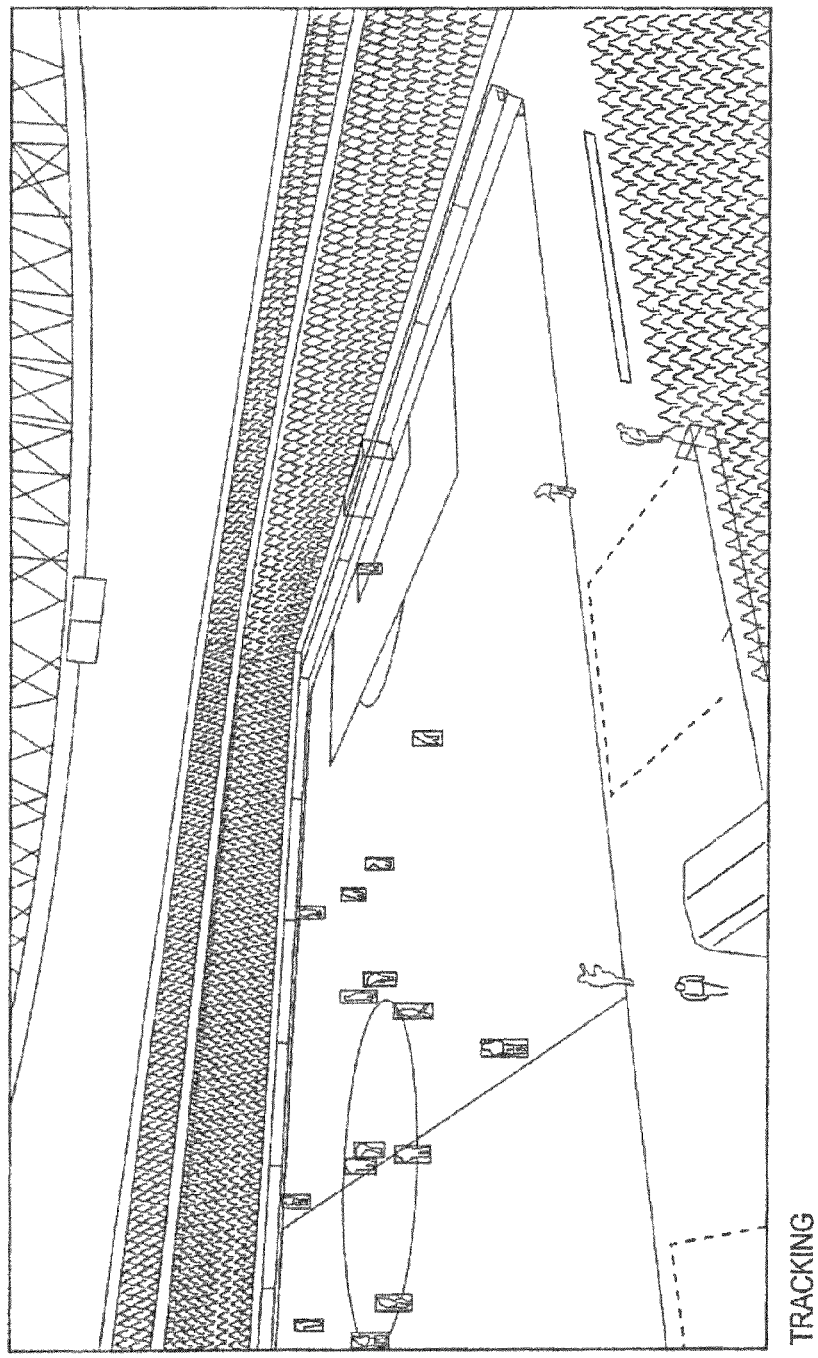
FIG. 24 is an illustration of a video image which has been processed in accordance with the present technique to show tracked positions of players.

FIGS. 22, 23A, 23B and 24 provide example illustrations of frames of example video images of a football match in which the present technique has been used to track players and produce a 3D model of the football match as a virtual model. FIG. 22 provides an example illustration of a video image produced by one HD camera of a football match. FIG. 23A provides an illustration of the video image of FIG. 22 in which the image has been processed to produce the background only using the mean value of each pixel, and FIG. 23B provides an illustration of the video image of FIG. 22 in which the image has been processed to produce the background only using the variance of each pixel in the image. FIG. 24 provides an illustration of a result of the tracking which is to provide a bounded box around each player in correspondence with the example shown in FIG. 5A.

Figure 25:
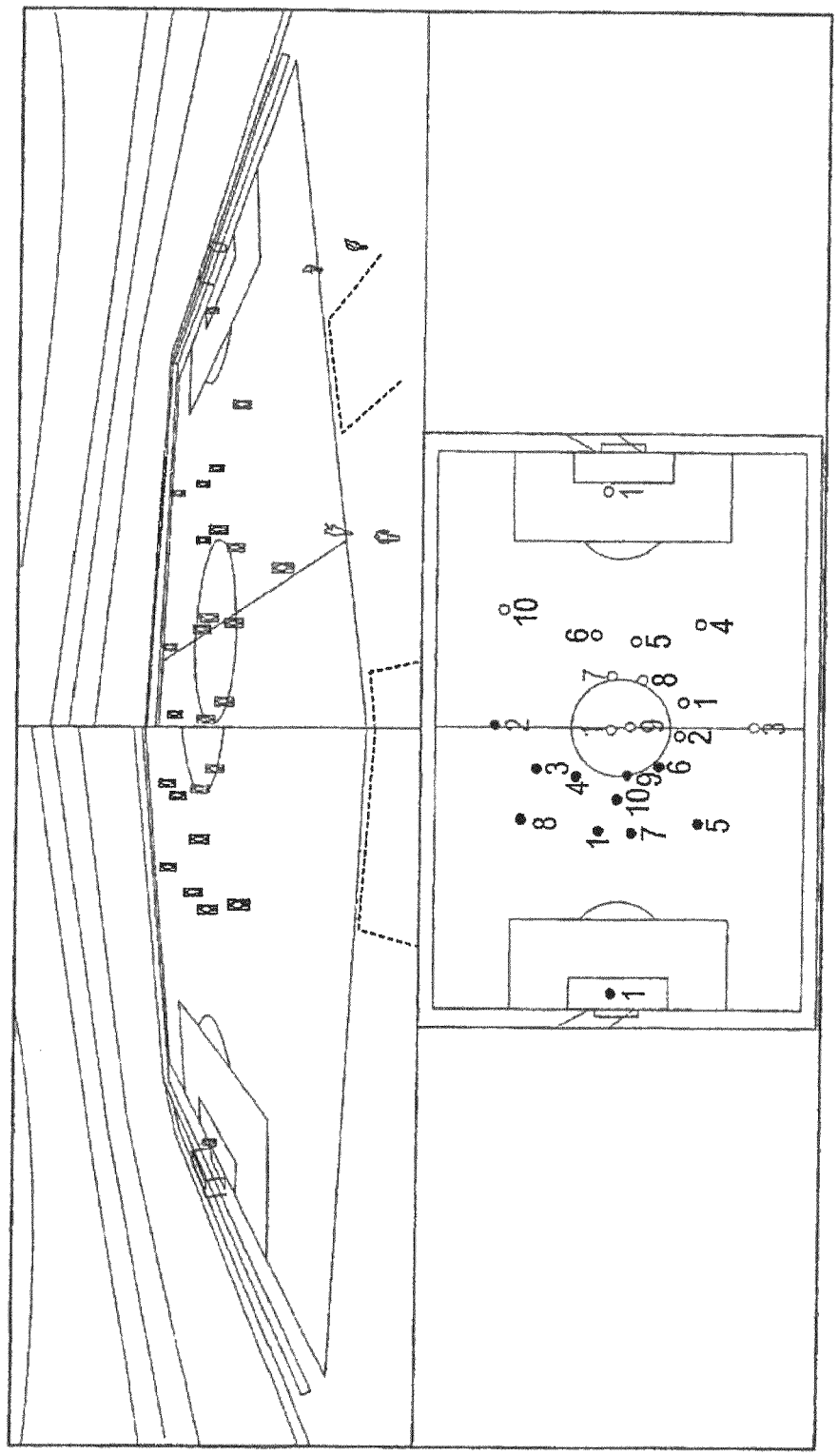
FIG. 25 is an illustration of two video images which have been captured from two different cameras, one for each side of the pitch and an illustration of a virtual representation of the football match in which the position of the players is tracked with respect to time.

FIG. 25 provides a corresponding illustration in which two cameras have been used (such as the cameras 22.1, 22.2) to generate video images each positioned respectively to view a different half of the pitch. In both the left half and the right half, the players are tracked as illustrated by the bounding boxes, which have been superimposed over each player.

In the lower half of FIG. 25, a virtual model of the football match has been generated to represent the position of the players, as numbered in accordance with their position on the pitch as viewed by the cameras in the two dimensional video images in the upper half of FIG. 25. Thus the 3D model view of the football match corresponds to the illustration of the virtual model shown in FIG. 5B or FIG. 7.

Tracking Overlaid on Live Video

Figure 26:
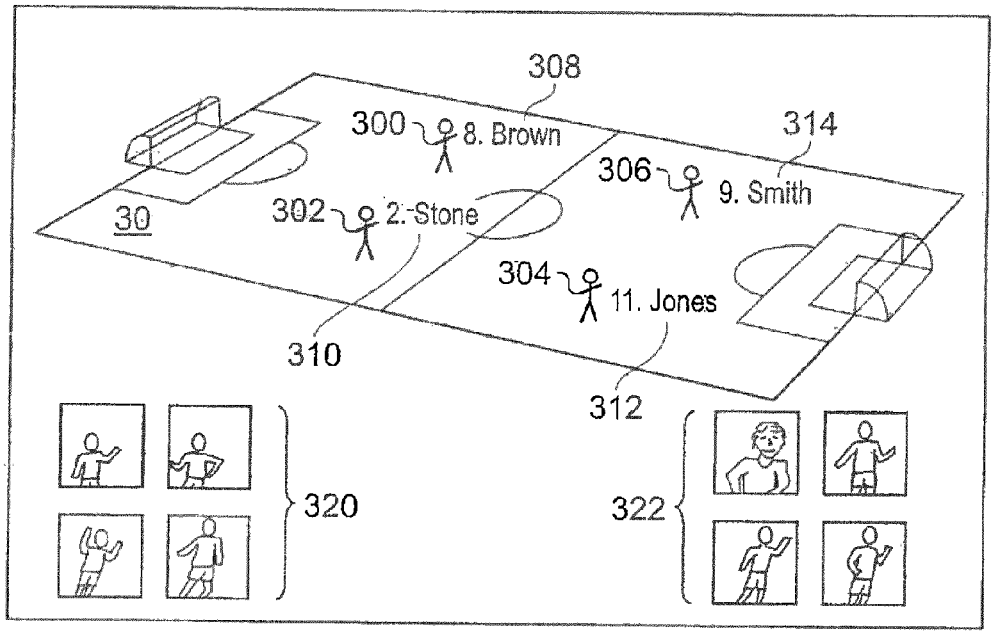
FIG. 26 is a representation of a video image of a football match in which the players which have been tracked in accordance with the present technique are labelled.

According to the present technique tracking information, which is generated with respect to a 3D model of a 2D image of a football match as described above, can be added to the video images captured by a video camera. An example is illustrated in FIG. 26. As illustrated in FIG. 5B, the 3D model of the football pitch is used to assist in the tracking and detection of the players on that football pitch. Once the relative position of the players have been detected from the 3D model then a mask for that player is then projected onto the 2D image and used to assist in the detection and tracking of the players within the 2D image. However, once a player's position has been identified with a relatively high probability then the position of that player within the 2D video image of the camera is known. Accordingly, a graphic illustrating an identity of that player, as estimated by the tracking algorithm, can be overlaid on to the live video feed from the camera by the content processing workstation 10. Thus, as shown in FIG. 26, each of the players 300, 302, 304, 306 is provided with a corresponding label 308, 310, 312, 314 which is then used to follow that player around the pitch in order to track the identity of that player. Thus, having tracked the objects using the three dimensional model of the plane on which the objects are disposed, the relative position of the identified objects are projected back into the video images and a graphical label or identifier or other effect introduced, so that identifiers of the players can be viewed in the live or processed video images.

Also shown within an image view in FIG. 26 are two sets of extracted images 320, 322. Each of the sides on the football pitch is provided with one of the sets of extracted images 320, 322. Each image is an isolated section of the image provided from the camera 20, which aims as far as possible to isolate that player on the football pitch. Thus, having identified each of the players, then the image of that player within the video image can be extracted and displayed with other players within each of the sets corresponding to each of the teams on the football pitch. This presentation of the extracted images can provide an automatic isolation of a view of a particular player without a requirement for a separate camera to track that player throughout the football match. Thus, a single camera can be used to capture the entire football pitch, and each of the players can be tracked throughout the match as if the multiple cameras had been used to track each player. As a result, a significant reduction in expense and system complexity can be achieved.

Switching Between Real and Virtual Images

As explained above, with reference to FIGS. 5A and 5B, the process of tracking each of the players utilises a 3D model of the football pitch in order to assist in the identification and location of the players. Having gathered information as to an estimation of the position of the players and tracked that information between each of the frames of the video images (object path data), it is possible to create a virtual representation of the live video images by synthesising images of each of the players and representing those players within the 3D model. Furthermore, a relative position of a view of the model or synthesised camera position within the virtual space can be adjusted using known techniques to adapt the relative view of the 3D model of the football pitch. Thus, for each of the positions of the players with respect to time as determined from the image view produced by the camera, it is possible to recreate a virtual 3D view of that live football match from a desired position of the camera.

Figure 7:
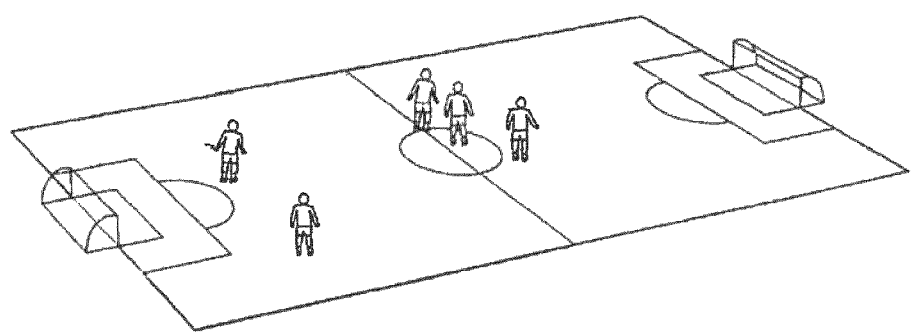
FIG. 7 is a three dimensional model of a football match, which is generated using the information generated by the content processing workstation of FIGS. 1 and 2.
Figure 27:
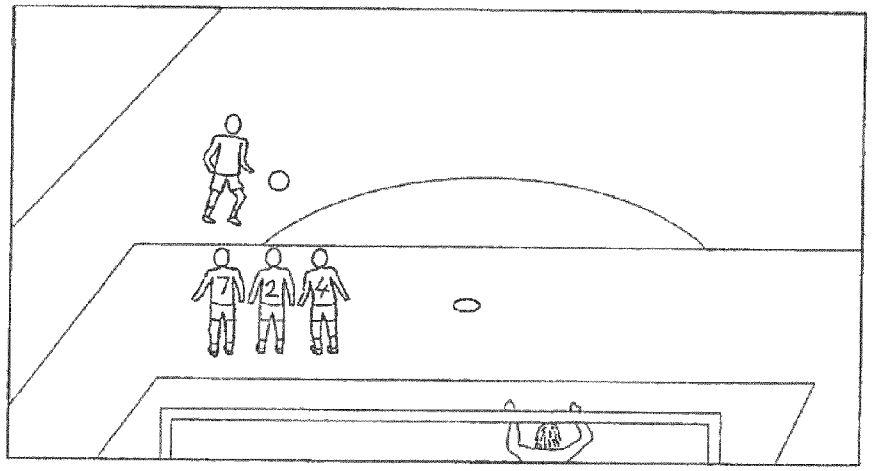
FIG. 27 is a three dimensional representation of a virtual model of a football match in which a view of the match can be changed.
Figure 28:
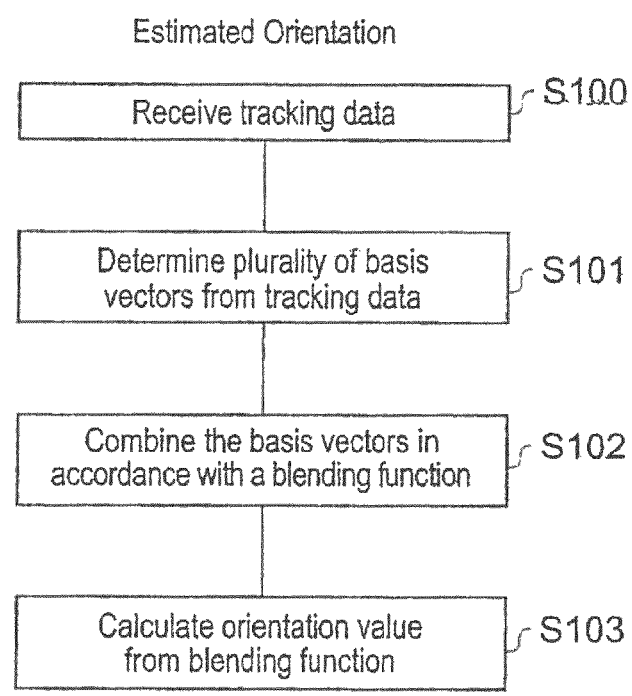
FIG. 28 is a flow diagram illustrating the player orientation process according to the present technique.

As illustrated in an example shown in FIG. 27, a 3D model has been synthesised by applying the path data for each player to the 3D model (as illustrated in FIGS. 5B and 7) and the players have been represented by a model of each player at a position which changes with respect to time. Furthermore, since the view of the 3D model can be changed, a relative position of the camera can be altered in order to provide a view of the match at a position where in reality there is no camera present. Thus, as an example, if a free kick has been awarded, as shown in FIG. 27, the relative position of the camera can be provided from behind the goal in order to provide a view of the free kick at a position where in reality there is no camera present.

This is achieved as described above using the projection matrix P and mapping the relative position in 3D of the camera position from the corners of the pitch. Furthermore, having estimated a relative orientation of each player as described above, then this relative orientation can also be provided with the path data for each player, and the synthesised model of the player can be displayed with that orientation, which will change with respect to time. Thus, the orientation of the player which is identified as part of the tracking process described above is provided with the path data to generate the 3D model of the football match and this orientation data is used to change the orientation of the player in the model as this corresponds to the real image.

FIG. 21 provides a flow diagram indicating a summary of the method according to the present invention. At step S100 the tracking data indicating the movement and location of one or more of the characters is received. At step S101 a plurality of basis vectors is determined from the tracking data. At step S102 the basis vectors are combined in accordance with the blending function, the blending function including blending coefficients which determine a relative magnitude of each basis vector. At step S103 the orientation value is calculated from the blending function.

As will be appreciated, various modifications may be made to the embodiments described above without departing from the scope of the present invention as defined in the appended claims. For example, although the example embodiments have been illustrated with reference to a football match, it will be appreciated that any other sporting event or entertainment event such as theatre could be viewed to apply the techniques disclosed above. Furthermore, other processors other than the Cell processor could be used to perform the technique. Processes according to the present technique, may be implemented in the form of a computer program product comprising processor-implementable instructions stored on a data carrier such as a floppy disk, optical disk, hard disk, PROM, RAM, flash memory or any combination of these or other storage media, or transmitted via data signals on a network such as an Ethernet, a wireless network, the internet, or any combination of these or other networks.

The invention claimed is:

1. A method of estimating an orientation of one or more of a plurality of objects disposed on a plane, from one or more video images of a scene, which includes the objects on the plane produced from a view of the scene by a video camera, the method comprising
receiving for each of the one or more objects, object tracking data, which provides a position of the object on the plane in the video images with respect to time,
determining from the object tracking data a plurality of basis vectors associated with at least one of the objects, each basis vector corresponding to a factor, which can influence the orientation of the object and each basis vector being related to the movement or location of the one or more objects, and
combining the basis vectors in accordance with a blending function to calculate an estimate of the orientation of the object on the plane, the blending function including blending coefficients which determine a relative magnitude of each basis vector used in the blending function.

2. A method according to claim 1, wherein the basis vectors include a object velocity vector of the object, derived from an estimated velocity of the one or more objects determined from the object tracking data.

3. A method according to claim 1, wherein the basis vectors include a centre of attention vector determined by a centre of gravity of the estimated position of the one or more objects derived from the object tracking data.

4. A method according to claim 3, wherein the basis vectors include a centre of attention velocity vector determined by an estimated direction of motion of the centre of gravity.

5. A method according to claim 1, wherein the blending coefficients include an object velocity coefficient set in dependence upon the estimated velocity of the one or more objects.

6. A method according to claim 1, wherein the blending coefficients include a centre of attention distance coefficient set in dependence upon an estimated distance of the one or more objects from the centre of attention derived from the object tracking data.

7. A method according to claim 1, wherein the object tracking data is representative of a three dimensional estimation of the one or more objects' movement and location derived from a two dimensional representation of the one or more objects in an environment.

8. A method according to claim 1, comprising
for each of the one or more objects performing the steps of determining from the object tracking data a plurality of basis vectors for each object, and the combining of the basis vectors in accordance with the blending function, to calculate an estimate of the orientation of each of the one or more objects on the plane.

9. A method as claimed in claim 8, comprising
generating a graphical model representing the one or more objects on the plane, and
combining the object tracking data with the estimation of the orientation of the object,
adjusting the position of the one or more objects on the plane in accordance with the object tracking data, and
setting the orientation of the one or more objects on the plane in accordance with the estimation of the orientation of the object on the plane.

10. A method as claimed in claim 8 or 9, wherein the object path data is generated by
processing the captured video images so as to extract one or more image features from each object,
comparing the one or more image features with sample image features from a predetermined set of possible example objects which the video images may contain,
identifying the objects from the comparison of the image features with the stored image features of the possible example objects,
generating object path data, which includes object identification data for each object which identifies the respective object; and provides a position of the object on the plane in the video images with respect to time;
calculating a projection matrix for projecting the position of each of the objects according to the object path data from the plane into a three dimensional model of the plane, for generating the three dimensional representation of the scene, by projecting the position of the objects according to the object path data into the plane of the three dimensional model of the scene using the projection matrix.

11. Computer software comprising program code stored on a non-transitory computer-readable storage medium, which, when executed on a computer, executes a method according to claim 1.

12. An apparatus for estimating an orientation of one or more of a plurality of objects disposed on a plane, from one or more video images of a scene, which includes the objects on the plane produced from a view of the scene by a video camera, the apparatus including a data processor operable
to receive for each of the one or more objects, object tracking data, which provides a position of the object on the plane in the video images with respect to time,
to determine from the object tracking data a plurality of basis vectors associated with at least one of the objects, each basis vector corresponding to a factor, which can influence the orientation of the object and each basis vector being related to the movement or location of the one or more objects, and
to combine the basis vectors in accordance with a blending function to calculate an estimate of the orientation of the object on the plane, the blending function including blending coefficients which determine a relative magnitude of each basis vector used in the blending function.

13. An apparatus according to claim 12, wherein the basis vectors include a object velocity vector derived from an estimated velocity of the one or more objects determined from the object tracking data.

14. An apparatus according to any of claims 12 or 13, wherein the basis vectors include a centre of attention vector determined by a centre of gravity of the estimated position of the one or more objects derived from the object tracking data.

15. An apparatus according to claim 14, wherein the basis vectors include a centre of attention velocity vector determined by an estimated direction of motion of the centre of gravity.

16. An apparatus according to claim 12, wherein the blending coefficients include:
a object velocity coefficient set in dependence of the estimated velocity of the one or more objects, and
a centre of attention distance coefficient set in dependence of an estimated distance of the one or more objects from the centre of attention derived from the object tracking data.

17. An apparatus according to any claim 12, wherein the object tracking data is representative of a three dimensional estimation of the one or more objects' movement and location derived from a two dimensional representation of the one or more objects in an environment.

18. An apparatus according to claim 12, wherein the data processor is operable
for each of the one or more objects to determine from the object tracking data a plurality of basis vectors for each object, and to combine the basis vectors in accordance with the blending function, to calculate an estimate of the orientation of each of the one or more objects on the plane.

19. An apparatus according to claim 18, comprising
a graphical processor operable
to generate a graphical model representing the one or more objects on the plane,
to combine the object tracking data with the estimation of the orientation of the object,
to adjust the position of the one or more objects on the plane in accordance with the object tracking data, and
to set the orientation of the one or more objects on the plane in accordance with the estimation of the orientation of the object on the plane.

20. An apparatus as claimed in claim 18 or 19, wherein the data processor is operable to generate the object path data by
processing the captured video images so as to extract one or more image features from each object,
comparing the one or more image features with sample image features from a predetermined set of possible example objects which the video images may contain,
identifying the objects from the comparison of the image features with the stored image features of the possible example objects,
generating object path data, which includes object identification data for each object which identifies the respective object; and provides a position of the object on the plane in the video images with respect to time, and
calculating a projection matrix for projecting the position of each of the objects according to the object path data from the plane into a three dimensional model of the plane, for generating the three dimensional representation of the scene, by projecting the position of the objects according to the object path data into the plane of the three dimensional model of the scene using the projection matrix.

* * * * *